United States Patent
Han et al.

(10) Patent No.: US 10,642,092 B2
(45) Date of Patent: May 5, 2020

(54) POLARIZER, METHOD OF MANUFACTURING THE SAME, AND DISPLAY DEVICE

(71) Applicant: Samsung Display Co., Ltd., Yongin-si (KR)

(72) Inventors: Kang Soo Han, Seoul (KR); Eun Jung Kim, Suwon-si (KR); Gug Rae Jo, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 194 days.

(21) Appl. No.: 15/420,810

(22) Filed: Jan. 31, 2017

(65) Prior Publication Data

US 2018/0024399 A1 Jan. 25, 2018

(30) Foreign Application Priority Data

Jul. 19, 2016 (KR) .................. 10-2016-0091099

(51) Int. Cl.
*G02F 1/1335* (2006.01)
*G02B 5/30* (2006.01)
(Continued)

(52) U.S. Cl.
CPC ..... *G02F 1/133528* (2013.01); *G02B 5/3058* (2013.01); *G02F 1/1339* (2013.01);
(Continued)

(58) Field of Classification Search
CPC ............ G02F 1/133528; G02F 1/1339; G02F 1/133536; G02F 1/134309; G02F 1/133512; G02F 1/136227; G02F 1/1368; G02F 2001/133538; G02F 2001/133548; G02F 2201/121; G02F 1/13362; G02F 1/1347; G02F 1/13471; G02F 1/0311; G02F 1/116; G02F 1/1335; G02F 1/133533; G02F 2001/133531; G02F 2001/133521; G02F 2001/13356; G02F 2001/133541;
(Continued)

(56) References Cited

U.S. PATENT DOCUMENTS

| 7,900,678 B2 | 3/2011 | Mitsam et al. |
| 8,468,480 B2 | 6/2013 | Inanami et al. |

(Continued)

FOREIGN PATENT DOCUMENTS

KR 2011-0134002 12/2011

*Primary Examiner* — Shan Liu
(74) *Attorney, Agent, or Firm* — H.C. Park & Associates, PLC

(57) ABSTRACT

A polarizer including: a base layer including a first area and a second area enclosing the first area; a polarizing part disposed on the first area of the base layer and including a plurality of linear patterns spaced apart from each other; a dummy part disposed on the second area of the base layer and spaced apart from the polarizing part; and a hard mask residue part disposed on a portion of the second area of the base layer between the polarizing part and the dummy part and contacting the base layer. The polarizing part and the dummy part include a metal layer disposed on the base layer, and a hard mask layer disposed on the metal layer and comprising the same material as the hard mask residue part.

17 Claims, 21 Drawing Sheets

(51) Int. Cl.
*G02F 1/1339* (2006.01)
*G02F 1/1333* (2006.01)
*G02F 1/1343* (2006.01)
*G02F 1/1362* (2006.01)
*G02F 1/1368* (2006.01)

(52) U.S. Cl.
CPC ...... *G02F 1/133536* (2013.01); *G02F 1/1368* (2013.01); *G02F 1/133512* (2013.01); *G02F 1/134309* (2013.01); *G02F 1/136227* (2013.01); *G02F 2001/133388* (2013.01); *G02F 2001/133538* (2013.01); *G02F 2001/133548* (2013.01); *G02F 2001/133565* (2013.01); *G02F 2201/121* (2013.01)

(58) Field of Classification Search
CPC ........ G02F 2001/133543; G02F 2001/133545; G02F 2001/13355; G02F 2001/133562; G02F 2001/133567; G02F 2203/16; G02B 5/3058; G02B 5/3016; G02B 5/3033; G02B 6/0056; G02B 6/02109; B29D 11/00644; B32B 17/10458; B32B 2307/42; H01L 51/5293; H01R 12/7005; H04B 10/532; G01J 5/0825; G03F 9/7065; G01R 33/3678; C09K 19/0208

USPC ...................... 349/96–103, 194; 359/485.05
See application file for complete search history.

(56) References Cited

U.S. PATENT DOCUMENTS

| | | | |
|---|---|---|---|
| 2008/0100781 A1* | 5/2008 | Choo | G02F 1/133536 349/96 |
| 2008/0121939 A1 | 5/2008 | Murray et al. | |
| 2013/0082029 A1 | 4/2013 | Hatogai et al. | |
| 2014/0016059 A1* | 1/2014 | Lee | G02B 5/3058 349/46 |
| 2015/0158240 A1* | 6/2015 | Haase | G03F 7/0002 264/293 |
| 2016/0116798 A1* | 4/2016 | Nam | G02F 1/133528 349/42 |
| 2016/0124265 A1* | 5/2016 | Lee | G02F 1/133528 349/43 |
| 2016/0146997 A1* | 5/2016 | Son | G02B 5/3058 359/485.05 |
| 2016/0357063 A1* | 12/2016 | Liu | G02B 5/3058 |
| 2017/0307935 A1* | 10/2017 | Park | G02F 1/133536 |
| 2017/0336687 A1* | 11/2017 | Kitajima | G02F 1/133512 |

\* cited by examiner

POLARIZER, METHOD OF MANUFACTURING THE SAME, AND DISPLAY DEVICE

CROSS-REFERENCE TO RELATED APPLICATION

This application claims priority from and the benefit of Korean Patent Application No. 10-2016-0091099, filed on Jul. 19, 2016, which are hereby incorporated by reference for all purposes as if fully set forth herein.

BACKGROUND

Field

Exemplary embodiments relate to a polarizer, a method of manufacturing the same, and a display device.

Discussion of the Background

Display devices such as liquid crystal displays are generally formed from a mother substrate including multiple cells, which may be cut during a manufacturing process to form a liquid crystal display. In this case, polarizers for controlling the polarization state of light are commonly used in liquid crystal displays. Polarizers may change natural light into a single beam of linearly polarized light.

In general, a film-type polarizer has been used in a liquid crystal display to produce polarized light, but currently, a wire grid polarizer is widely used as an alternative. Specifically, a method for transferring a pattern of a mold, for example, nano-imprint, has been proposed as a method for forming a wire grid polarizer, which is a polarizer element having a nano-size linear pattern.

However, when a mold is not uniformly pressured during transfer of a pattern of a mold, the pattern of the mold may not be uniformly transferred to an object layer, which may cause drawbacks such as non-uniform linear patterns in a wire grid polarizer.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a method of manufacturing a polarizer capable of forming a uniform linear pattern, a polarizer having a uniform linear pattern, and a display device including the polarizer.

Additional aspects will be set forth in the detailed description which follows, and, in part, will be apparent from the disclosure, or may be learned by practice of the inventive concept.

According to an exemplary embodiment, a polarizer includes a base layer including a first area and a second area enclosing the first area, a polarizing part disposed on the first area of the base layer and including a plurality of linear patterns spaced apart from each other, a dummy part disposed on the second area of the base layer and spaced apart from the polarizing part, and a hard mask residue part disposed on a portion of the second area of the base layer between the polarizing part and the dummy part and contacting the base layer, in which the polarizing part and the dummy part include a metal layer disposed on the base layer, and a hard mask layer disposed on the metal layer and including the same material as the hard mask residue part.

According to an exemplary embodiment, a method of manufacturing a polarizer includes preparing a base layer including a first area and a second area enclosing the first area, forming a metal layer on the first area and the second area of the base layer, etching the metal layer to form a first portion disposed on the first area and a second portion disposed on the second area and spaced apart from the first portion, forming a hard mask layer on the first portion, the second portion, and a third portion of the base layer between the first part and the second part, forming a resist layer on the hard mask layer, pressing the resist layer by a mold to form a resist pattern thereon, etching the hard mask layer by using the resist pattern as a first mask, and etching the first portion and the second portion by using the etched hard mask layer as a second mask.

According to an exemplary embodiment, a display device includes a first substrate, a second substrate facing the first substrate, and a liquid crystal layer interposed between the first substrate and the second substrate. The first substrate includes a first base layer including a first area and a second area enclosing the first area, a first polarizing part disposed on the first area of the first base layer and including a plurality of first linear patterns spaced apart from each other, a first dummy part disposed on the second area of the first base layer and spaced apart from the first polarizing part, and a first hard mask residue part disposed on a portion of the second area of the first base layer between the first polarizing part and the first dummy part and contacting the first base layer, in which the first polarizing part and the first dummy part include a first metal layer disposed on the first base layer, and a first hard mask layer disposed on the first metal layer and including the same material as the first hard mask residue part.

The foregoing general description and the following detailed description are exemplary and explanatory and are intended to provide further explanation of the claimed subject matter.

DETAILED DESCRIPTION OF THE ILLUSTRATED EMBODIMENTS

Figure 1:
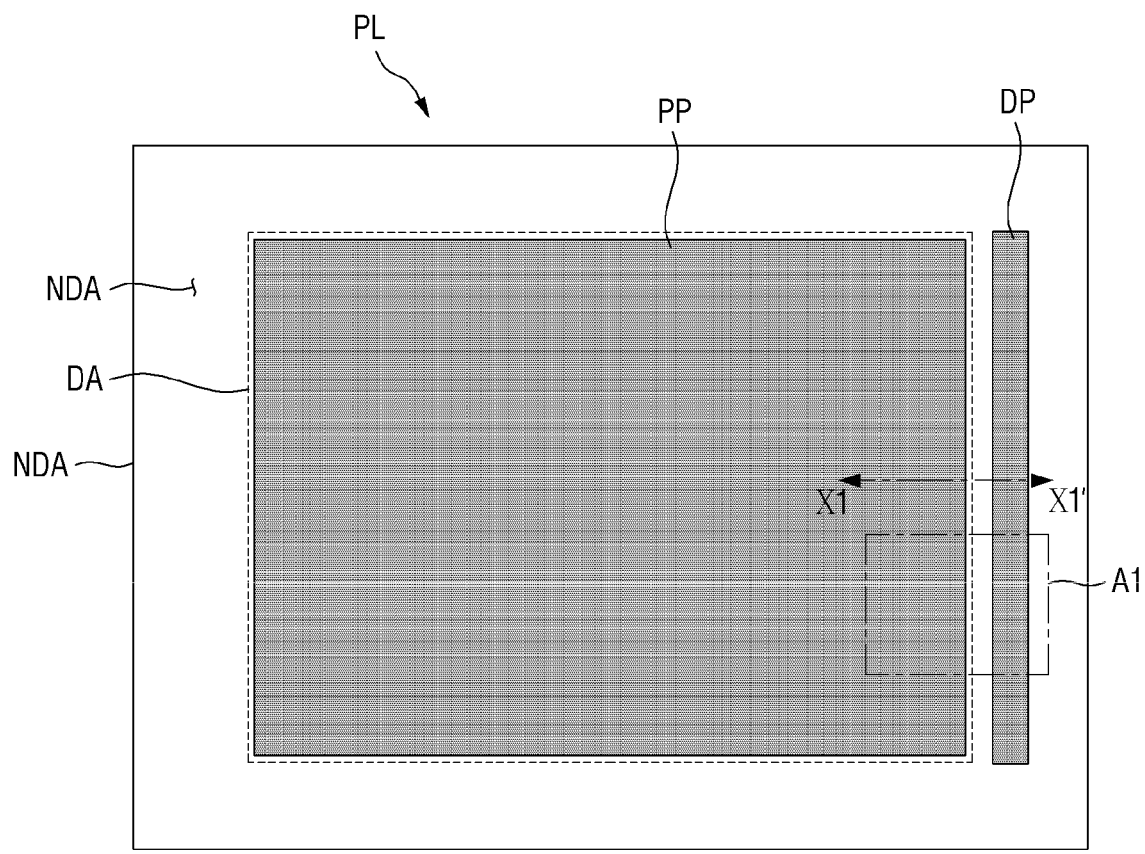
FIG. 1 is a plan view of a polarizer according to an exemplary embodiment.
Figure 1:
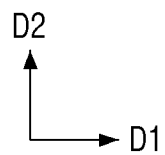

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense unless expressly so defined herein.

Figure 2:
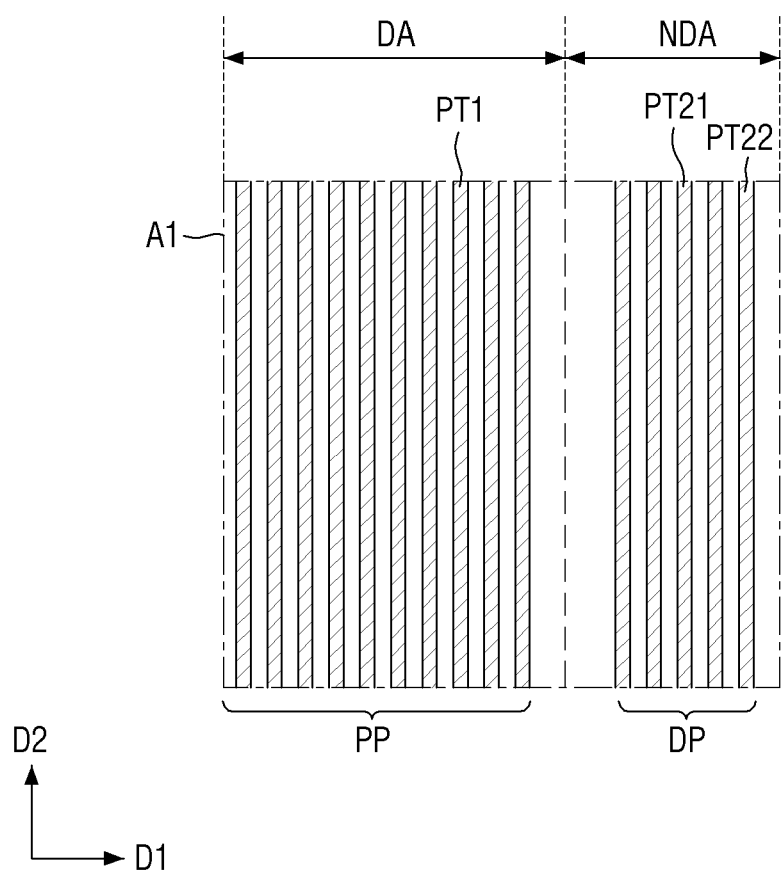
FIG. 2 is an enlarged view of part A1 of the polarizer of FIG. 1.
Figure 3:
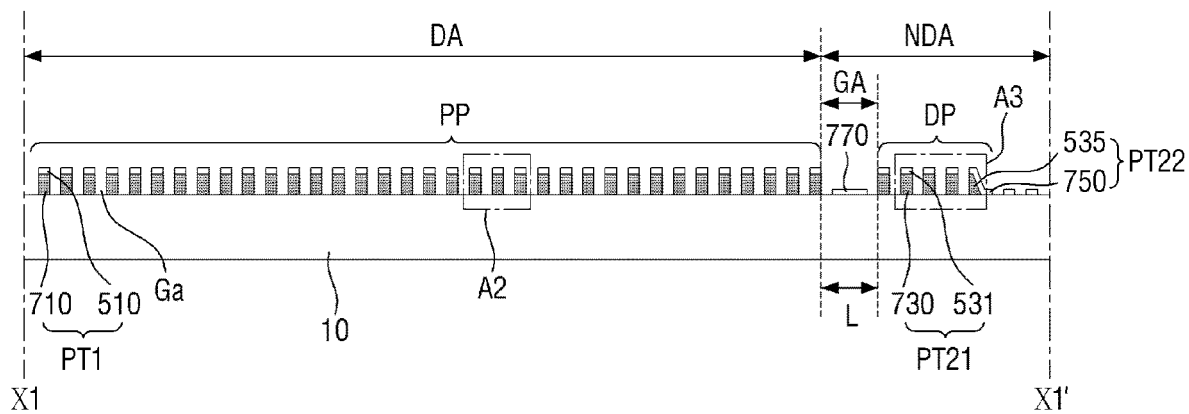
FIG. 3 is a cross-sectional view taken along line X1-X1' of FIG. 1.
Figure 4:
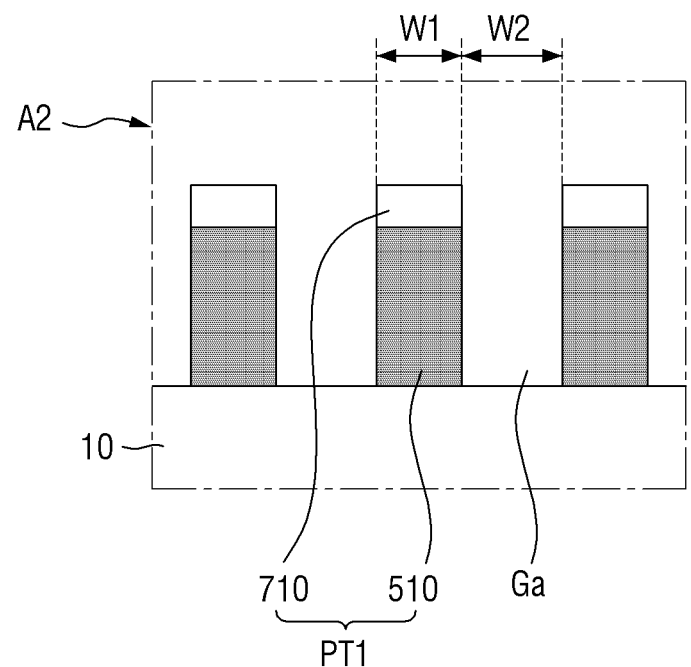
FIG. 4 is an enlarged view of part A2 and part A3 of the polarizer of FIG. 3.
Figure 4:
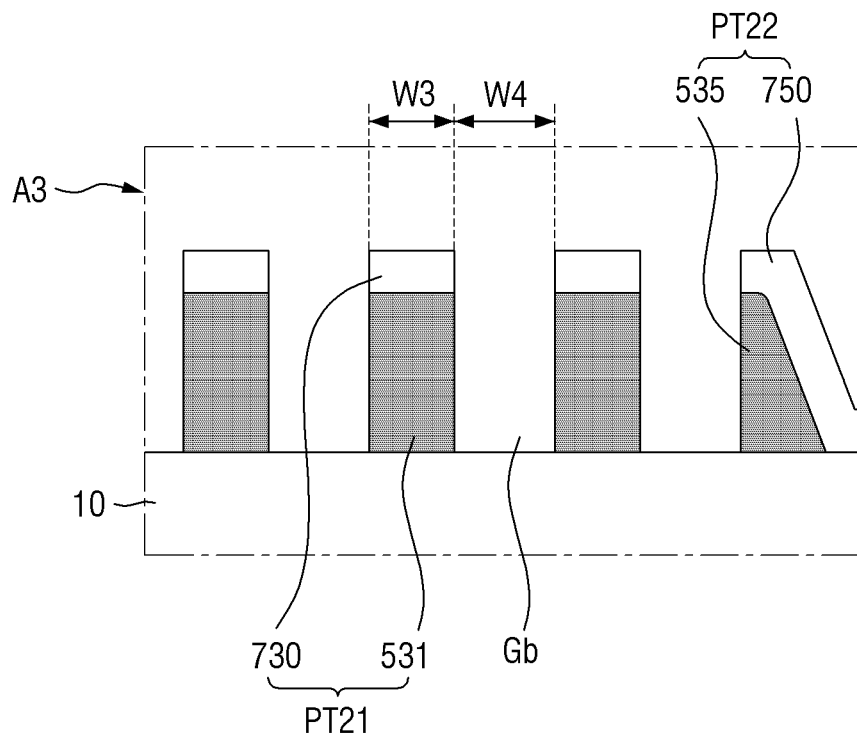
Figure 5:
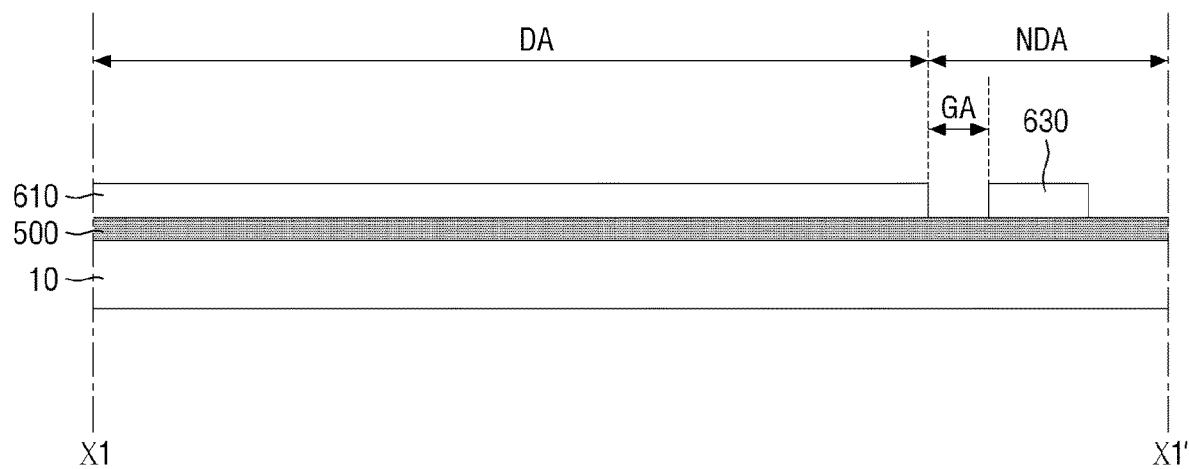
FIG. 5, FIG. 6, FIG. 7, FIG. 8, FIG. 9, FIG. 10, FIG. 11, FIG. 12, FIG. 13, FIG. 14, and FIG. 15 are cross-sectional views illustrating process steps of manufacturing the polarizer shown in FIG. 3.

FIG. 1 is a plan view of a polarizer according to an exemplary embodiment. FIG. 2 is an enlarged view of part A1 of FIG. 1. FIG. 3 is a cross-sectional view taken along line X1-X1' of FIG. 1. FIG. 4 is an enlarged view of part A2 and part A3 of FIG. 3.

Referring to FIG. 1 to FIG. 4, a polarizer PL according to an exemplary embodiment may include a base layer 10, a polarizing part PP, a dummy part DP, and a hard mask residue part 770.

The base layer 10 may include a transparent insulation substrate. As used herein, the term "being transparent" may be referred to as being 100% transparent as well as being semi-transparent that at least satisfies a transmittance level of a predetermined design condition. For example, the base layer 10 may include a glass substrate, a quartz substrate, a transparent resin substrate, and the like. The base layer 10 may also include polymers or plastics having high heat resistance. In exemplary embodiments, the base layer 10 may be flexible. In particular, the base layer 10 may be a transformable substrate which may be rolled, folded, or bent.

The base layer 10 may include a first area DA, and a second area NDA enclosing the first area DA. In terms of a display device which will be described later, the first area DA may be a display area where an image is displayed, and the second area NDA may be a non-display area where an image is not displayed. Alternatively, the first area DA may be a portion of the base layer 10 corresponding to the display area of the display device, and the second area NDA may be another portion of the base layer 10 corresponding to the non-display area of the display device.

The polarizing part PP may be disposed on the first area DA. The polarizing part PP may polarize light transmitting through the base layer 10, and may include multiple linear patterns PT1 spaced apart from each other by a predetermined gap. More specifically, each of the linear patterns PT1 may have a first width W1 and extend in a second direction D2. The linear patterns PT1 may be spaced apart from each other in a first direction D1 with a gap Ga having a second width W2 disposed therebetween, such that the linear patterns PT1 are parallel with each other.

The linear patterns PT1 may be arranged with a period shorter than the wavelength of visible light. The second width W2 of the gap Ga may be less than the wavelength of incident light such that the polarizing part PP may provide a superior polarizing function. For example, when incident light is visible light, the wavelength of the visible light may be approximately 400 nm to 700 nm. Accordingly, polarization characteristics may be obtained when the second width W2 is 400 nm or less. As such, the second width W2 may be 100 nm or less to achieve excellent polarizing performance. The first width W1 of the linear pattern PT1, through which light may not pass, may be 100 nm or less. In exemplary embodiments, the first width W1 and the second width W2 may have a ratio of 1:1. For example, the first width W1 may be approximately 30 nm to 60 nm, and the second width W2 may be approximately 30 nm to 60 nm.

Light may travel while vibrating disorderly in horizontal and vertical directions with respect to a traveling direction. Therefore, when light is incident to the linear pattern PT1, only light vibrating in a direction perpendicular to an extending direction of the linear pattern PT1 may pass through the polarizing part PP. When the polarizing part PP is a reflective type, residual light may be reflected by the linear pattern PT1. When the polarizing part PP is an absorptive type, residual light may be absorbed by the linear pattern PT1. More particularly, only P-polarized light may pass through the polarizing part PP, and S-polarized light may not pass through the polarizing part PP and be absorbed or reflected thereby. In this manner, only P-polarized light may travel in an upward direction.

When the polarizing part PP is a reflective type, S-polarized light reflected by the linear pattern PT1 may be scattered by a light guide plate provided in a backlight unit (not shown) beneath the polarizing part PP in a display device, such that the polarization properties may be offset. The S-polarized light may then be reflected back by a reflecting plate provided in the backlight unit and re-incident to the polarizing part PP, and the process may be repeated. In this manner, optical efficiency may further be improved and provide lower power consumption and/or bright enhancement. Hereinafter, for convenience of description, the polarizing part PP according to exemplary embodiments will be described with reference to a reflective type, and the linear pattern PT1 will be described in more detail later.

The dummy part DP may be disposed on the second area NDA of the base layer 10. The dummy part DP may be an element for improving reliability of the linear pattern PT1 in the process of manufacturing the linear pattern PT1 of the polarizing part PP. The dummy part DP may be disposed along an edge of the polarizing part PP and may be spaced apart from the polarizing part PP. The dummy part DP and the polarizing part PP may include the same material.

In exemplary embodiments, the dummy part DP may have a stripe shape in plan view, and extend along the edge of the polarizing part PP or in the second direction D2, as shown in FIG. 2.

In exemplary embodiments, the dummy part DP may include at least one dummy linear pattern PT21 and at least one dummy defective pattern PT22. The dummy linear pattern PT21 and the dummy defective pattern PT22 may extend in the second direction D2. As described above, the dummy part DP may be disposed on the second area NDA of the base layer 10. When the polarizer PL is applied to the display device, the second area NDA may be disposed in the non-display area of the display device, such as an area where an image is not displayed. In this manner, the dummy part DP may not affect the display quality of the display device even when the dummy part DP includes the dummy defective pattern PT22.

In exemplary embodiments, when the dummy part DP includes two or more dummy linear patterns PT21, the two or more dummy linear patterns PT21 may be spaced apart from each other in the first direction D1 with a gap Gb therebetween.

The polarizing part PP and the dummy part DP may include metal layers 510, 531, and 535 disposed on the base layer 10 and contacting the base layer 10, and hard mask layers 710, 730, and 750 disposed on the metal layers 510, 531, and 535.

More specifically, the linear pattern PT1 of the polarizing part PP may include the linear metal layer 510 disposed on the first area DA of the base layer 10, and the linear hard mask layer 710 disposed on the linear metal layer 510. The linear metal layer 510 may contact the first area DA of the base layer 10, and the linear hard mask layer 710 may be disposed directly on the linear metal layer 510.

The linear metal layer 510 may include at least one of aluminum (Al), gold (Au), silver (Ag), copper (Cu), chrome (Cr), iron (Fe), and nickel (Ni). In an exemplary embodiment, the linear metal layer 510 may include aluminum (Al) having relatively higher reflectivity among the above described metals.

The linear hard mask layer 710 may include an inorganic insulation material, for example, silicon nitride ($SiN_x$) or silicon oxide ($SiO_x$). In an exemplary embodiment, the linear hard mask layer 710 may include silicon dioxide ($SiO_2$).

The dummy linear pattern PT21 of the dummy part DP may include the dummy linear metal layer 531 disposed on the second area NDA of the base layer 10, and the dummy linear hard mask layer 730 disposed on the dummy linear metal layer 531. The dummy linear metal layer 531 may contact the second area NDA of the base layer 10, and the dummy linear hard mask layer 730 may be disposed directly on the dummy linear metal layer 531.

The dummy linear metal layer 531 may include the same material as that of the linear metal layer 510, and the dummy linear hard mask layer 730 may include the same material as that of the linear hard mask layer 710 described above.

Referring to FIG. 4, the dummy linear pattern PT21 of the dummy part DP may have a third width W3, and the third width W3 may be substantially the same as the first width W1 of the linear pattern PT1. The dummy linear pattern PT21 and the linear pattern PT1 may be formed through a pattern transfer process (for example, nano-imprint) using the same mold. As such, when the dummy part DP includes the dummy linear pattern PT21, the third width W3 of the dummy linear pattern PT21 may be substantially the same as the first width W1 of the linear pattern PT1, and a shape of a cross-sectional surface of the dummy linear pattern PT21 may be substantially the same as a shape of a cross-sectional surface of the linear pattern PT1.

When the dummy part DP includes two or more dummy linear patterns PT21, the two or more dummy linear patterns PT21 may be spaced apart from each other with the gap Gb having a fourth width W4 therebetween. The fourth width W4 may be substantially the same as the second width W2 of the gap Ga between the linear patterns PT1. Furthermore, in exemplary embodiments, a pitch of the linear pattern PT1 may be substantially the same as a pitch of the dummy linear pattern PT21. More particularly, a sum of the first width W1 and second width W2 may be substantially the same as a sum of the third width W3 and fourth width W4.

When the dummy part DP includes the dummy defective pattern PT22, the dummy defective pattern PT22 may include a dummy defective metal layer 535 disposed on the second area NDA of the base layer 10, and the dummy defective hard mask layer 750 disposed on the dummy defective metal layer 535. The dummy defective pattern PT22 may be an unintended and/or random defective pattern generated in the dummy part DP during the process of forming the linear pattern PT1, and thus, a shape of a cross-sectional surface of the dummy defective pattern PT22 may be different from those of the linear pattern PT1 and the dummy linear pattern PT21. For example, as shown in FIG. 4, one of the dummy defective metal layer 535 may have a slanted side surface. The dummy defective metal layer 535 may contact the second area NDA of the base layer 10, and the dummy defective hard mask layer 750 may be disposed directly on the dummy defective metal layer 535. In exemplary embodiments, the dummy defective hard mask layer 750 may partially directly contact the base layer 10.

The dummy defective metal layer 535 may include the same material as those of the linear metal layer 510 and the dummy linear metal layer 531, and the dummy defective hard mask layer 750 may include the same material as those of the linear hard mask layer 710 and the dummy linear hard mask layer 730.

The polarizing part PP and the dummy part DP may be spaced apart from each other, and a boundary area GA, which is a part of the second area NDA of the base layer 10, may be disposed between the polarizing part PP and the dummy part DP. In particular, the polarizing part PP and the dummy part DP may not be disposed on the boundary area GA in the second area NDA of the base layer 10.

The width of the boundary area GA, or the shortest gap or the shortest horizontal gap L between the polarizing part PP and the dummy part DP may be greater than the first width W1 of the linear pattern PT1. As used herein, "the shortest horizontal gap" may mean the shortest gap between two components when the two components are projected on the same plane, in other words, the shortest gap between the two components in plan view. In exemplary embodiments, the minimum gap L between the polarizing part PP and the dummy part DP may be greater than the sum of the first width W1 and the second width W2. More particularly, the minimum gap L between the polarizing part PP and the dummy part DP may be greater than the pitch of the linear pattern PT1.

The hard mask residue part 770 may be disposed on a portion of the second area NDA of the base layer 10, that is, on the boundary area GA. The hard mask residue part 770 may be a part remaining on the boundary area GA in the process of forming the hard mask layers 710, 730, and 750. As such, the hard mask residue part 770 may include the same material as those of the hard mask layers 710, 730, and 750, and may directly contact the boundary area GA of the base layer 10.

The polarizer PL according to an exemplary embodiment described above may have the dummy part DP disposed along the edge of the polarizing part PP, by which the linear pattern PT1 may be uniformly formed, specifically, in an area adjacent to the boundary area GA. Thus, the polarizer PL may have an improved reliability.

FIG. 5 to FIG. 15 are cross-sectional views illustrating process steps for manufacturing the polarizer shown in FIG. 3.

Referring to FIG. 5 to FIG. 15, a metal layer 500 may be formed on substantially the entire surface of the base layer 10 including the first area DA and the second area NDA as shown in FIG. 3. The metal layer 500 may include at least one of aluminum (Al), gold (Au), silver (Ag), copper (Cu), chrome (Cr), iron (Fe), and nickel (Ni). The metal layer 500 may be formed on the base layer 10 through sputtering or the like.

Subsequently, a photoresist layer may be formed on the metal layer 500, and the photoresist layer may be exposed and developed by using a photomask to form a first photoresist pattern 610 and a second photoresist pattern 630.

The first photoresist pattern 610 may be formed on a portion of the metal layer 500, and overlaps the first area DA of the base layer 10. The second photoresist pattern 630 may be formed on a portion of the metal layer 500, and overlaps the second area NDA. The second photoresist pattern 630 is spaced apart from the first photoresist pattern 610, and the second photoresist pattern 630 may not be formed in a portion the second area NDA that overlaps the boundary area GA. In particular, the photoresist pattern may not be formed on a portion of the metal layer 500 overlapping the boundary area GA of the base layer 10.

Figure 6:
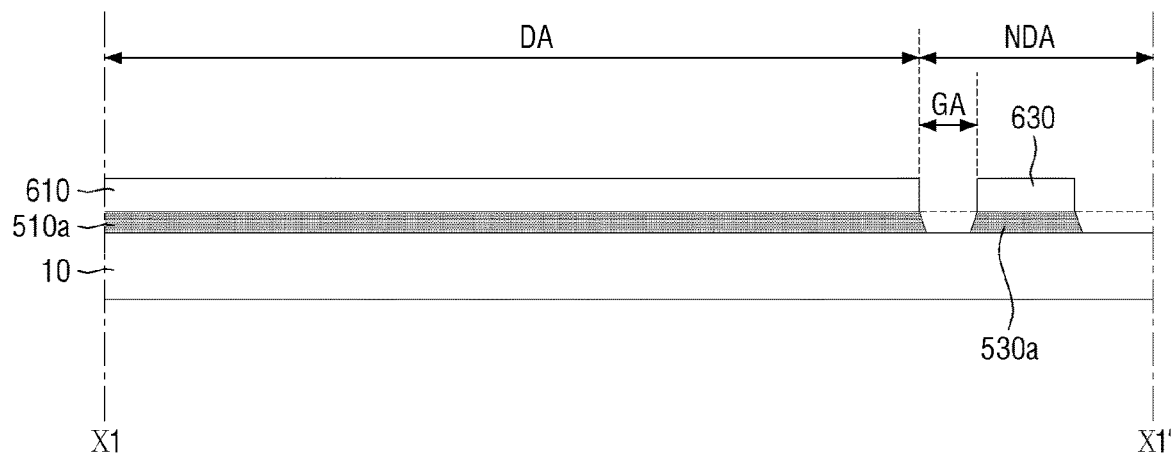

Subsequently, as shown in FIG. 6, the metal layer 500 may be etched by using the first photoresist pattern 610 and the second photoresist pattern 630 as an etching mask. In an exemplary embodiment, the metal layer 500 may be etched through a wet etching process, but the present disclosure is not limited thereto. Thus, a part of the metal layer 500 not covered by the first photoresist pattern 610 and the second photoresist pattern 630 may be removed, and specifically, a part of the metal layer 500 disposed on the boundary area GA of the base layer 10 may be removed. Furthermore, a first part 510a may be formed beneath the first photoresist pattern 610, and a second part 530a may be formed beneath the second photoresist pattern 630.

Figure 7:
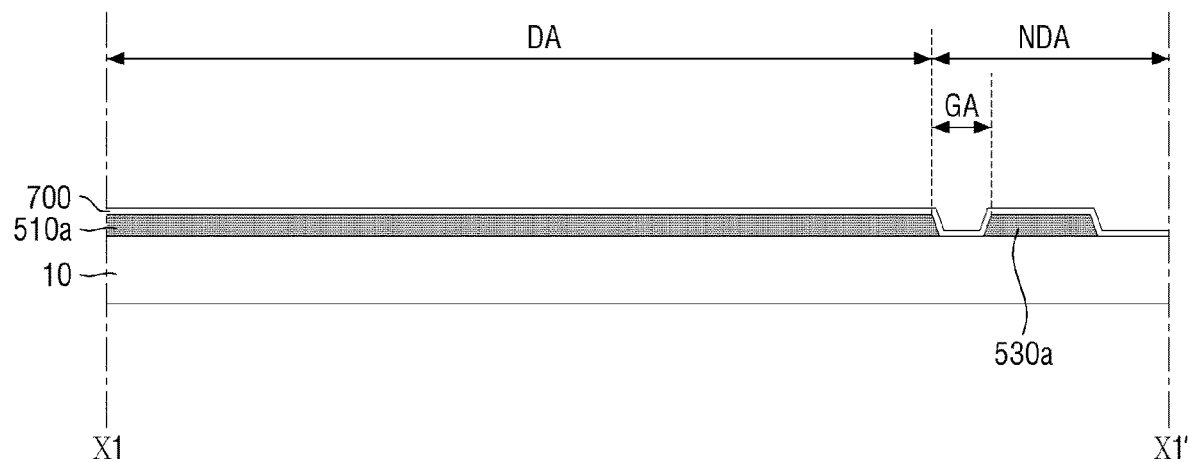

Subsequently, the first photoresist pattern 610 and the second photoresist pattern 630 may be removed, and as shown in FIG. 7, a hard mask layer 700 may be formed on substantially the entire surface of the base layer 10 including the first area DA and the second area NDA. The hard mask layer 700 may include an inorganic insulation material, for example, silicon nitride ($SiN_x$) or silicon oxide ($SiO_x$). In exemplary embodiments, the hard mask layer 700 may be formed by a chemical vapor deposition or the like. The hard mask layer 700 may cover the first part 510a and the second part 530a, and may directly contact the boundary area GA of the base layer 10 disposed between the first part 510a and the second part 530a.

Figure 8:
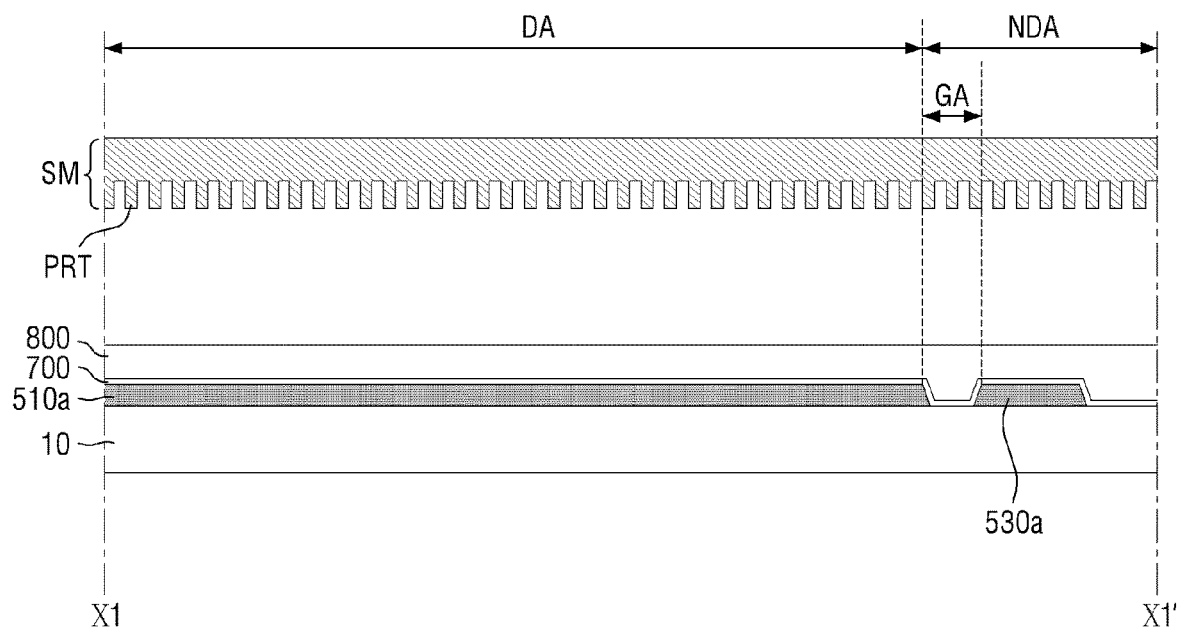

Subsequently, as shown in FIG. 8, a resist layer 800 may be formed on the hard mask layer 700. The resist layer 800 may include general thermosetting resin or photocurable resin that are well known in the art. For example, the thermosetting resin may include urea resin, melamine resin, phenol resin, and the like. Furthermore, the photocurable resin may include a polymerizable compound having a polymerizable functional group, a photopolymerization initiator for initiating a polymerization of the polymerizable compound by light irradiation, a surfactant, an antioxidant, and the like, but the present disclosure is not limited thereto. Hereinafter, the resist layer 800 will be described as including photocurable resin.

Subsequently, a mold SM having a convex-concave pattern PRT may be disposed on the resist layer 800. In exemplary embodiments, the mold SM may have flexibility, and may include a high polymeric material having high light transmittance.

Figure 9:
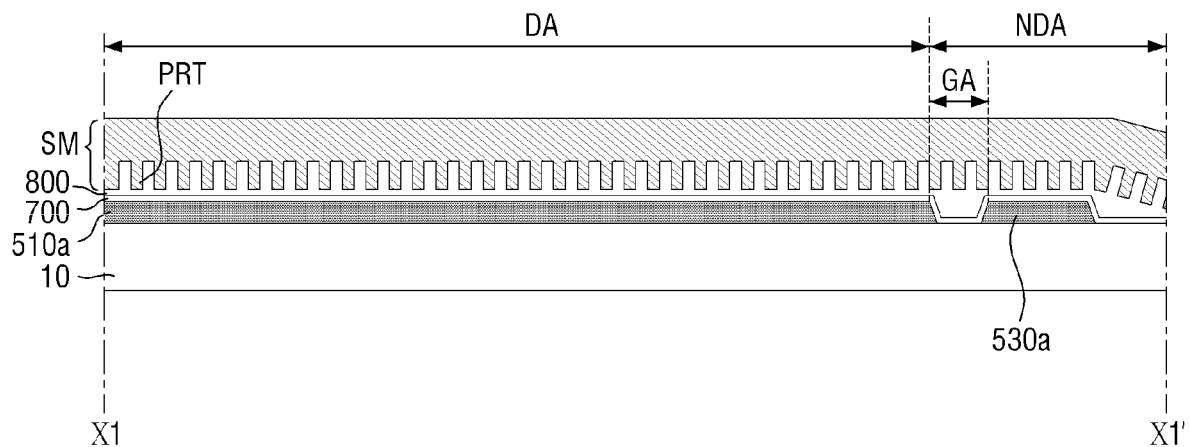

Subsequently, as shown in FIG. 9, the resist layer 800 may be pressed with the mold SM disposed thereon, such that the convex-concave pattern PRT of the mold SM may be transferred to the resist layer 800. More particularly, the convex-concave pattern PRT of the mold SM may be transferred to the resist layer 800 through a nano-imprint process.

Subsequently, the resist layer 800 may be irradiated with light so as to be hardened. As described above, the mold SM may include a material having high light transmittance, and thus, light may transmit through the mold SM and be incident on the resist layer 800.

Figure 10:
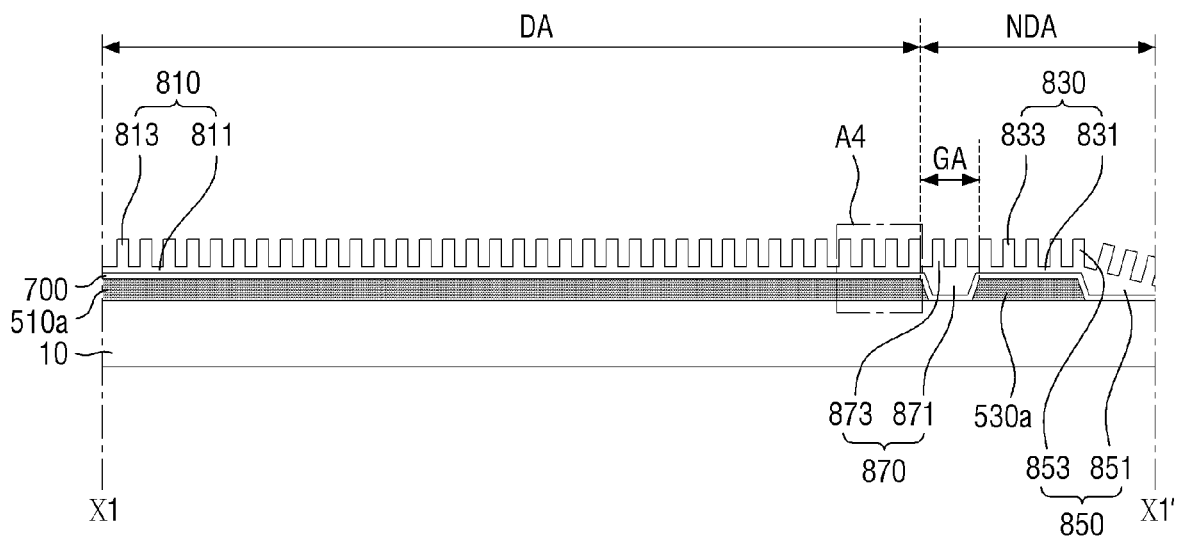

Subsequently, the mold SM may be removed from the hardened resist layer 800, thus forming a first resist pattern 810, a second resist pattern 830, a third resist pattern 850, and a fourth resist pattern 870, as shown in FIG. 10.

The first resist pattern 810 may be overlapped with the first area DA of the base layer 10, and may be disposed on the first part 510*a*. The first resist pattern 810 may include a first residual part 811 disposed on the first part 510*a*, and multiple first patterns 813 disposed on the first residual part 811.

Figure 11:
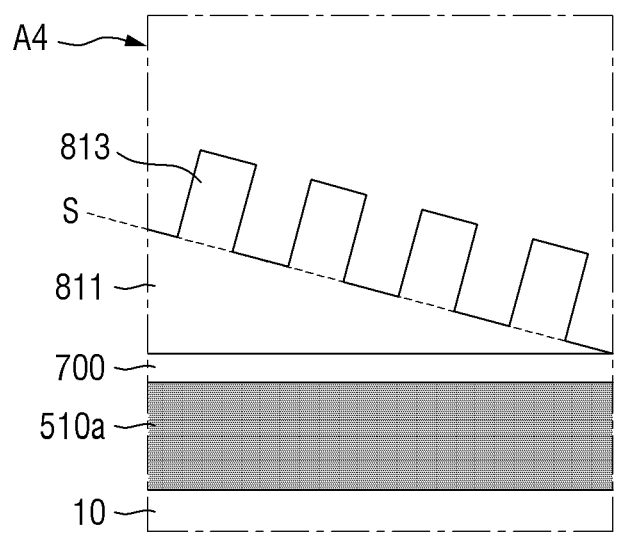

The mold SM (shown in FIG. 9) may be flexible, as described above, and thus may be curved or bent during a pattern transfer process. When the second part 530*a* is not formed on the base layer 10, the mold SM (shown in FIG. 9) may be partially sagged or curved at an edge of the first part 510*a*, and thus the resist layer 800 (shown in FIG. 9) located at the edge of the first part 510*a* may not be applied with a uniform pressure. For example, as shown in FIG. 11, the mold SM may be sagged at the edge of the first part 510*a* when the second part 530*a* is not formed. Accordingly, the first residual part 811 having a non-uniform thickness may be formed at the edge of the first part 510*a*, and the first patterns 813 may be formed on the first residual part 811 along a predetermined slope S. In this manner, the linear pattern PT1 (shown in FIG. 3) may not be formed uniformly at the edge of the first area DA when the linear pattern PT1 (shown in FIG. 3) is formed thereon. Furthermore, the mold SM (shown in FIG. 9) may directly contact a portion of the edge of the first part 510*a*, which may cause damage to the mold SM (shown in FIG. 9) itself.

Figure 12:
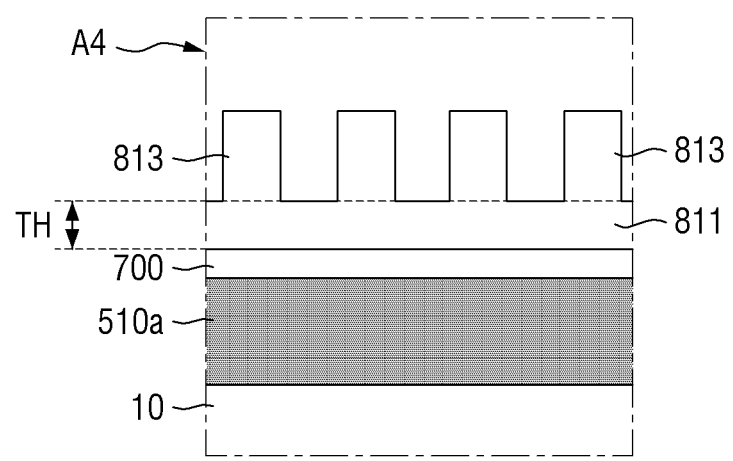

According to an exemplary embodiment, the second part 530*a* is formed at the edge of the first part 510*a* and may prevent the mold SM (shown in FIG. 9) from being partially sagged or curved at the edge of the first part 510*a*, and thus, pressing force of the mold SM (shown in FIG. 9) may be uniformly applied to the edge of the first part 510*a*. In this manner, the first residual part 811 having a uniform thickness TH may be formed on the edge of the first part 510*a*, and the first patterns 813 may be formed uniformly on the first residual part 811, as shown in FIG. 12. Thus, the linear pattern PT1 (shown in FIG. 3) to be formed thereon may be formed uniformly at the edge of the first area DA.

The second resist pattern 830 may be overlapped with the second area NDA of the base layer 10, and may be disposed on the second part 530*a*. The second resist pattern 830 may include a second residual part 831 disposed on the second part 530*a*, and second patterns 833 disposed on the second residual part 831. In exemplary embodiments, the second resist pattern 830 may include two or more second patterns 833. The second resist pattern 830 may be a pattern for forming the aforementioned dummy linear pattern PT21 (shown in FIG. 3), and in exemplary embodiments, the second residual part 831 may have a thickness substantially the same as the thickness TH of the first residual part 811. Furthermore, the width, thickness, and cross-sectional surface shape of the second pattern 833 may be substantially the same as the width, thickness, and cross-sectional surface shape of the first pattern 811.

The third resist pattern 850 may be overlapped with the second area NDA of the base layer 10, and may be partially disposed on the second part 530*a*. The third resist pattern 850 may include a third residual part 851, and third patterns 853 disposed on the third residual part 851. The aforementioned dummy defective pattern PT22 (shown in FIG. 3) of the dummy part DP (shown in FIG. 3) may be formed by the third resist patterns 850. In exemplary embodiments, the third residual part 851 may have a thickness partially greater than the thickness TH of the first residual part 811.

The fourth resist pattern 870 may be overlapped with the boundary area GA in the second area NDA of the base layer 10, and may be partially disposed on the hard mask layer 700. The fourth resist pattern 870 may include a fourth residual part 871, and fourth patterns 873 disposed on the fourth residual part 871. The fourth residual part 871 may have a thickness greater than the thickness TH of the first residual part 811. The hard mask residue part 770 (shown in FIG. 3) described above may be formed by the fourth resist patterns 870.

Figure 13:
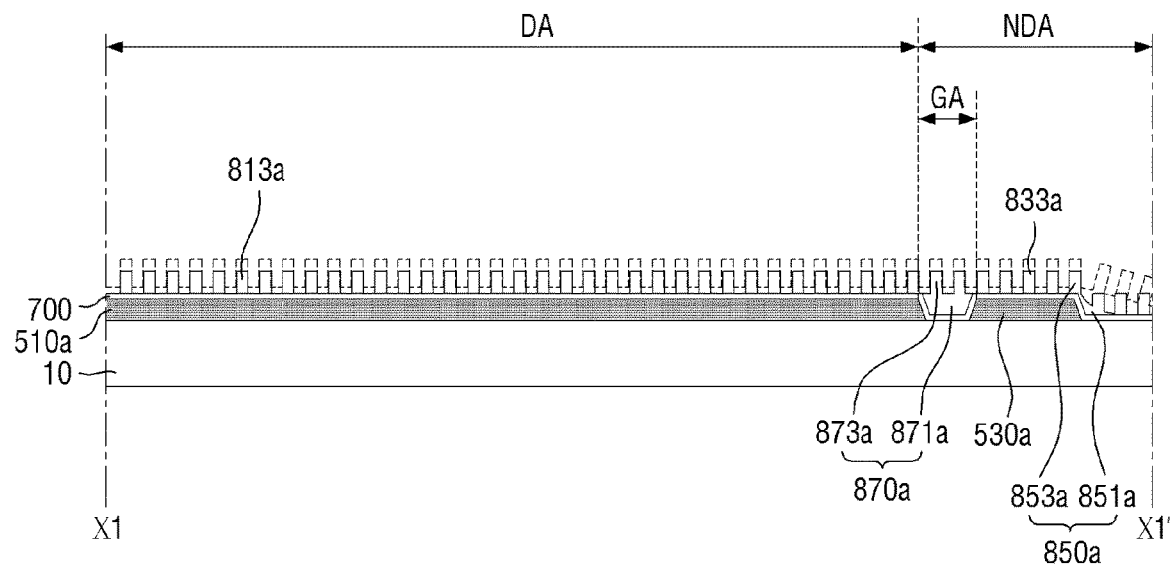

Subsequently, the first residual part 811 of the first resist pattern 810 may be removed through an ashing process or the like. In the process of removing the first residual part 811, the thickness of the first pattern 813 may be reduced, and thus first sub-patterns 813*a* may be formed, as shown in FIG. 13. As the first residual part 811 is removed, a part of the hard mask layer 700 interposed between the first sub-patterns 813*s* may be exposed.

Meanwhile, in the process of removing the first residual part 811, a part of the second resist pattern 830, the third resist pattern 850, and a part of the fourth resist pattern 870 may also be removed.

As described above, the thickness of the first residual part 811 of the first resist pattern 810 may be substantially the same as the thickness of the second residual part 831 of the second resist pattern 830. Thus, when the first residual part 811 is removed, the second residual part 831 may also be removed, and a second sub-pattern 833*a* in which the second pattern 833 is partially removed may be formed on the second part 530*a*. In this manner, a portion of the hard mask layer 700 disposed on the second part 530*a* may be partially exposed through the space between the second sub-patterns 833*a*.

The thickness of the first residual part 811 of the first resist pattern 810 may be less than the thickness of the third residual part 851 of the third resist pattern 850. Therefore, the third residual part 851 having a relatively greater thickness may partially remain even when the first residual part 811 is removed. Thus, when the first residual part 811 is removed, the third resist pattern 850 may become a third sub-resist pattern 850a with a partially reduced thickness, and the third sub-resist pattern 850a may be partially disposed on the second part 530a. The third sub-resist pattern 850a may include a third sub-residual part 851a in which the third residual part 851 is partially removed, and a third sub-pattern 853a in which the third pattern 853 is partially removed.

Furthermore, the thickness of the first residual part 811 of the first resist pattern 810 may be less than the thickness of the fourth residual part 871 of the fourth resist pattern 870. Therefore, the fourth residual part 871 having a relatively greater thickness may partially remain even when the first residual part 811 is removed. Thus, when the first residual part 811 is removed, the fourth resist pattern 870 may become a fourth sub-resist pattern 870a with a partially reduced thickness. The fourth sub-resist pattern 870a may include a fourth sub-residual part 871a in which the fourth residual part 871 is partially removed, and a fourth sub-pattern 873a in which the fourth pattern 873 is partially removed. The fourth sub-resist pattern 870a may remain on a part of the hard mask layer 700 that overlaps the boundary area GA, and may cover a part of the hard mask layer 700 overlapping the boundary area GA.

Figure 14:
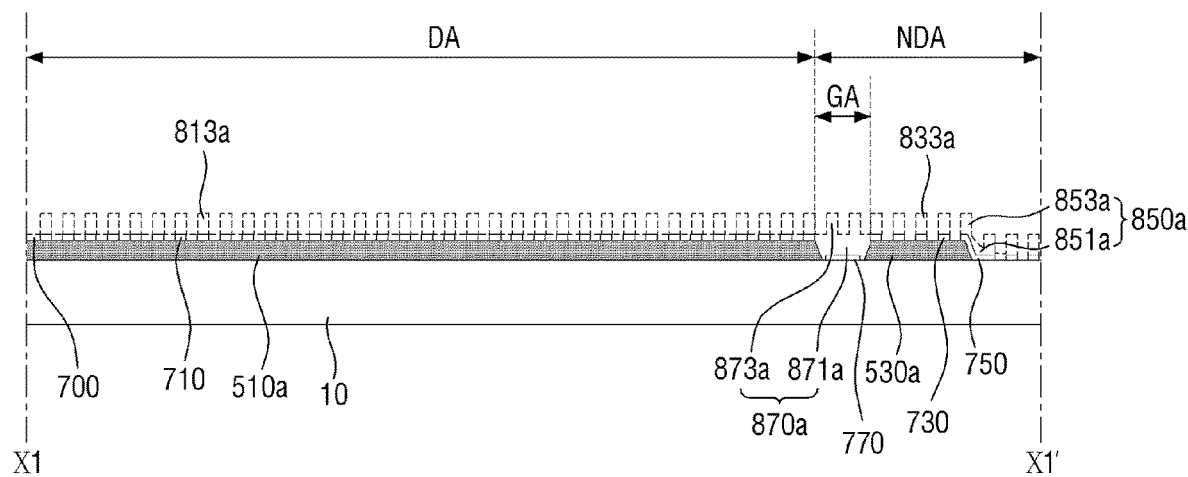

Subsequently, as shown in FIG. 14, the hard mask layer 700 may be etched by using the first sub-pattern 813a, the second sub-pattern 833a, the third sub-resist pattern 850a, and the fourth sub-resist pattern 870a as an etching mask. The linear hard mask layer 710 may be formed on the part of the hard mask layer 700 covered by the first sub-pattern 813a, and the dummy linear hard mask layer 730 may be formed on the part covered by the second sub-pattern 833a. Furthermore, the dummy defective hard mask layer 750 may be formed in a portion of the part of the hard mask layer 700 covered by the third sub-resist pattern 850a, and the hard mask residue part 770 may be formed in the part covered by the fourth sub-resist pattern 870a.

In exemplary embodiments, the first sub-pattern 813a, the second sub-pattern 833a, the third sub-resist pattern 850a, and the fourth sub-resist pattern 870a may be at least partially removed during the process of etching the hard mask residue part 770. Although, in the drawings, the first sub-pattern 813a, the second sub-pattern 833a, the third sub-resist pattern 850a, and the fourth sub-resist pattern 870a are illustrated as being completely removed, at least a part of the first sub-pattern 813a, the second sub-pattern 833a, the third sub-resist pattern 850a, and the fourth sub-resist pattern 870a may be remained. For example, although not shown in the drawings, the third sub-resist pattern 850a and the fourth sub-resist pattern 870a having relatively greater thicknesses may be partially remained.

Figure 15:
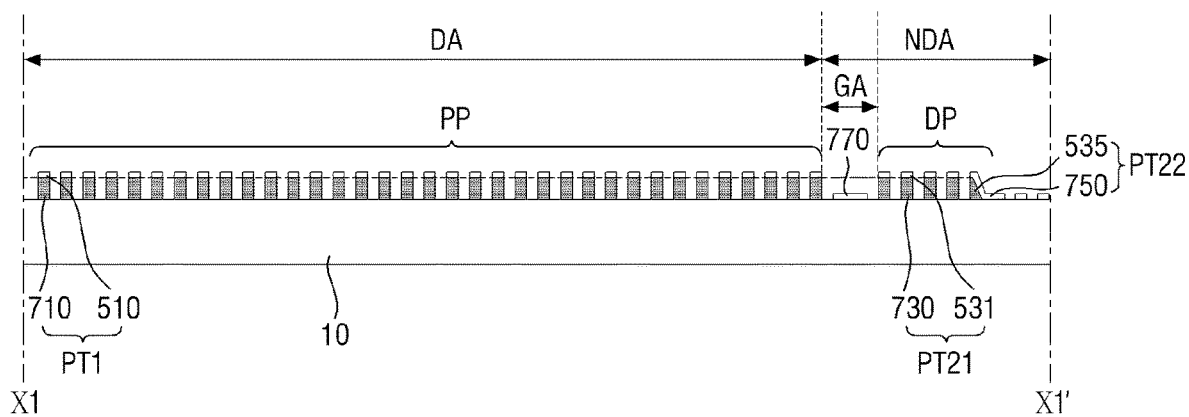

Subsequently, the first part 510a may be etched by using the linear hard mask layer 710 as a mask. Thus, the linear metal layer 510 may be formed in a portion of the first part 510a covered by the linear hard mask layer 710, as shown in FIG. 15. The linear metal layer 510 and the linear hard mask layer 710 may form the linear pattern PT1 of the polarizing part PP, as described above. Meanwhile, the second part 530a may also be etched during the process of etching the first part 510a. More specifically, the dummy linear metal layer 531 may be formed in the portion of the second part 530a covered by the dummy linear hard mask layer 730, as shown in FIG. 15, and the dummy defective metal layer 535 may be formed in the portion of the second part 530a covered by the dummy defective hard mask layer 750. The dummy linear metal layer 531 and the dummy linear hard mask layer 730 may form the dummy linear pattern PT21 of the dummy part DP, as described above. In addition, the dummy defective metal layer 535 and the dummy defective hard mask layer 750 may form the dummy defective pattern PT22. Furthermore, the hard mask residue part 770 may remain on the boundary area GA of the base layer 10.

A polarizer manufactured according to exemplar embodiments described above may have uniform linear pattern PT1 formed at the edge of the polarizing part PP, which may improve the reliability of the polarizer. Furthermore, the dummy part may also be formed during the process of forming the polarizing part PP without additional processes.

Figure 16:
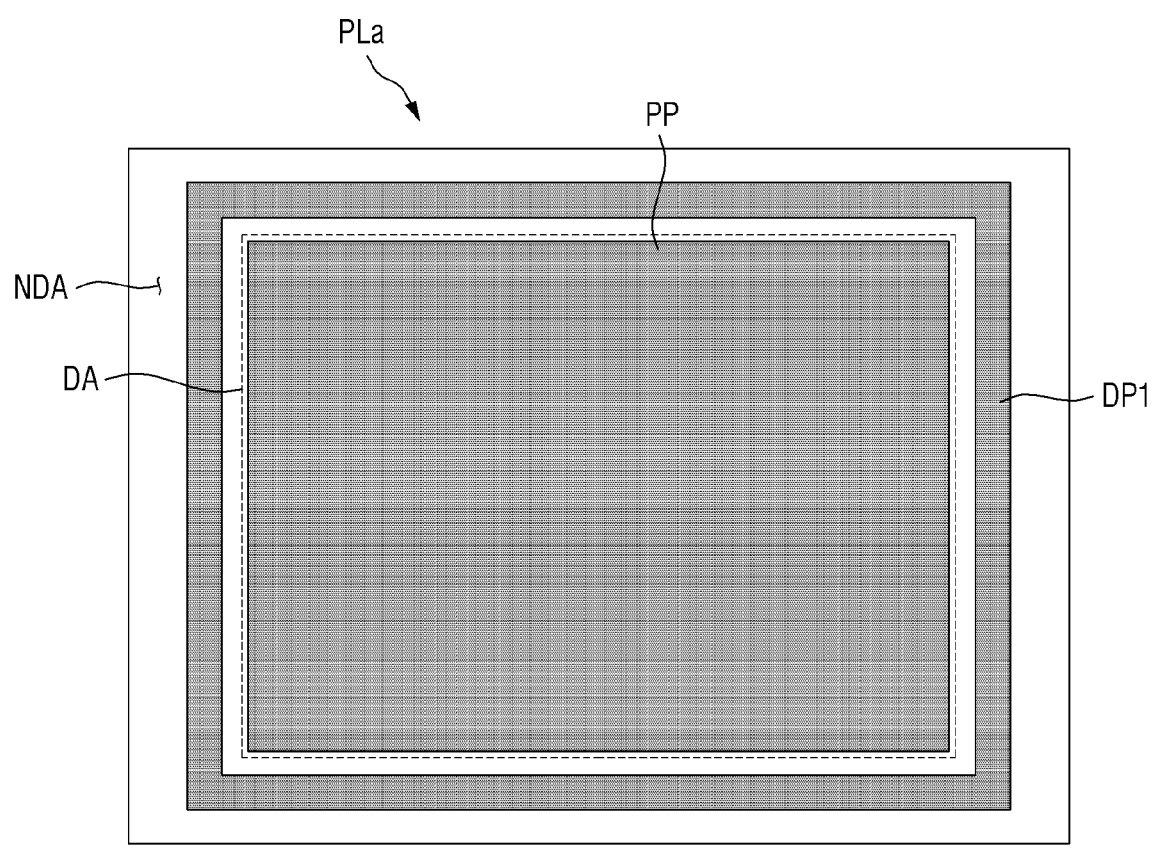
FIG. 16 is a plan view of a polarizer according to an exemplary embodiment.

FIG. 16 is a plan view of a polarizer according to an exemplary embodiment. Referring to FIG. 1 and FIG. 16, a polarizer PLa according to an exemplary embodiment may differ from the polarizer PL shown in FIG. 1, in that a dummy part DP1 is disposed to enclose or surround the polarizing part PP in the second area NDA in plan view. Other components of the polarizer PLa may be substantially the same as those described above with reference to FIG. 1 to FIG. 4, and thus, repeated description thereof will be omitted.

Figure 17:
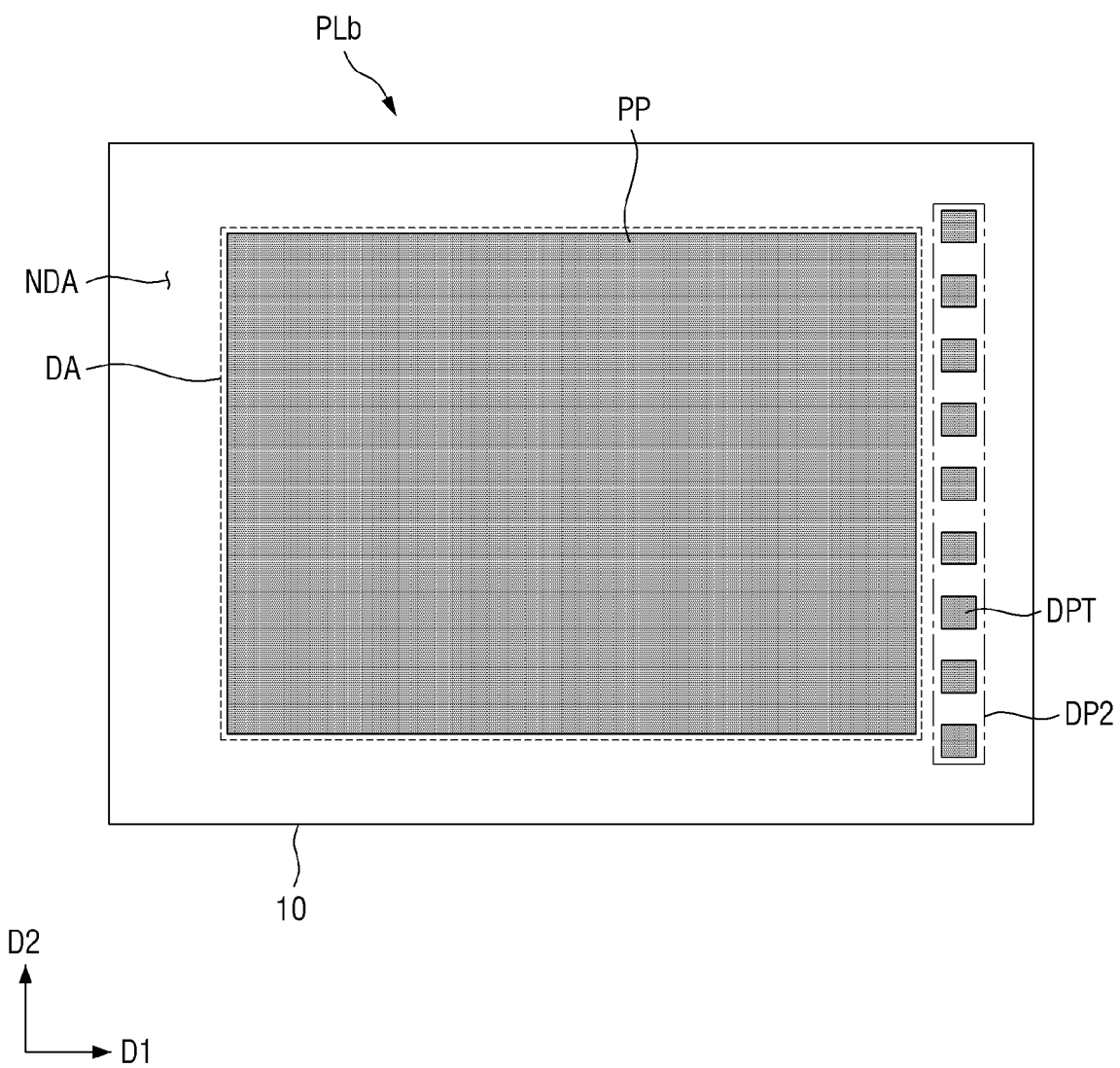
FIG. 17 is a plan view of a polarizer according to an exemplary embodiment.

FIG. 17 is a plan view of a polarizer according to an exemplary embodiment. Referring to FIG. 1 and FIG. 17, a polarizer PLb according to an exemplary embodiment may differ from the polarizer PL shown in FIG. 1, in that a dummy part DP2 includes multiple island dummy patterns DPT spaced apart from each other in the second direction D2. Other components of the polarizer PLb may be substantially the same as those described above with reference to FIG. 1 to FIG. 4. More particularly, the island dummy patterns DPT may also include the dummy linear pattern and/or the dummy defective pattern as described above with reference to FIG. 1 to FIG. 4, and each of the island dummy patterns DPT may include a metal layer and a hard mask layer disposed on the metal layer. Therefore, repeated description of the substantially the same components will be omitted.

Although, in the drawings, each of the island dummy patterns DPT has a square-shaped plane, however, the island dummy pattern DPT may have various shapes such as a circular shape, an elliptical shape, a triangular shape, and a polygonal shape with five or more angles.

Figure 18:
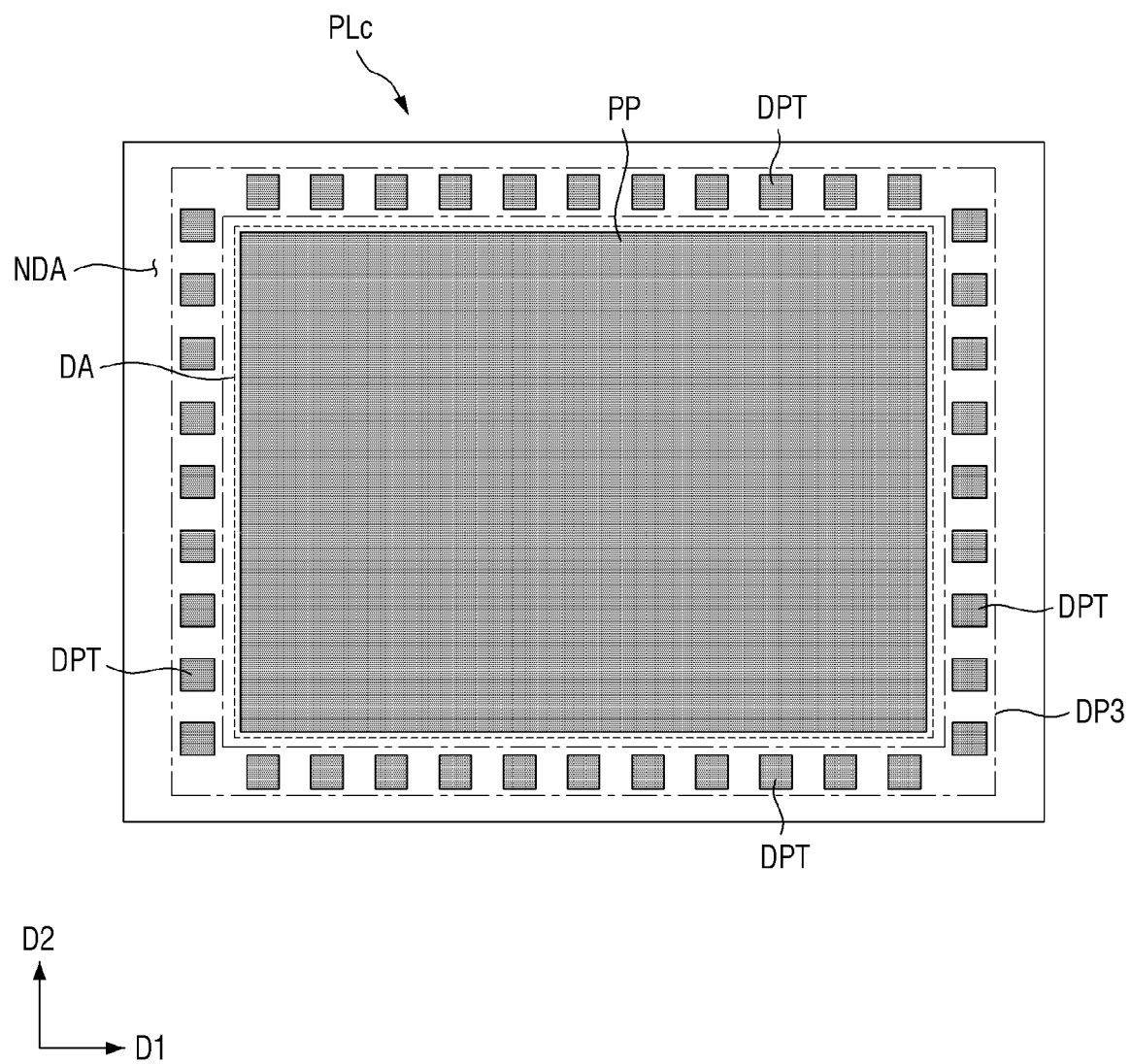
FIG. 18 is a plan view of a polarizer according to an exemplary embodiment.

FIG. 18 is a plan view of a polarizer according to an exemplary embodiment. Referring to FIG. 1, FIG. 16, and FIG. 18, a polarizer PLc according to an exemplary embodiment may differ from the polarizer PL shown in FIG. 1, in that a dummy parts DP3 are disposed to enclose the polarizing part PP in the second area NDA in plan view. Furthermore, the polarizer PLc according to an exemplary embodiment may differ from the polarizer PLb shown in FIG. 16 in that the dummy part DP3 includes multiple island dummy patterns DPT spaced apart from each other. More particularly, the island dummy patterns DPT may include the dummy linear patterns and/or dummy defective patterns as described above with reference to FIG. 1 to FIG. 4, and each of the island dummy patterns DPT may include a metal layer, and a hard mask layer disposed on the metal layer. Therefore, repeated description of the substantially the same components will be omitted.

Hereinafter, a display device including the above-described polarizer will be described. The display device may be one of a twisted nematic display device, a vertical alignment display device, a patterned vertical alignment display device, an in-plane switching (IPS) mode display device, a fringe-field switching (FFS) mode display panel, and a plane to line (PLS) switching mode display device. Hereinafter, for convenience of description, the display device will be described as a VA mode display device, but the present disclosure is not limited thereto.

Figure 19:
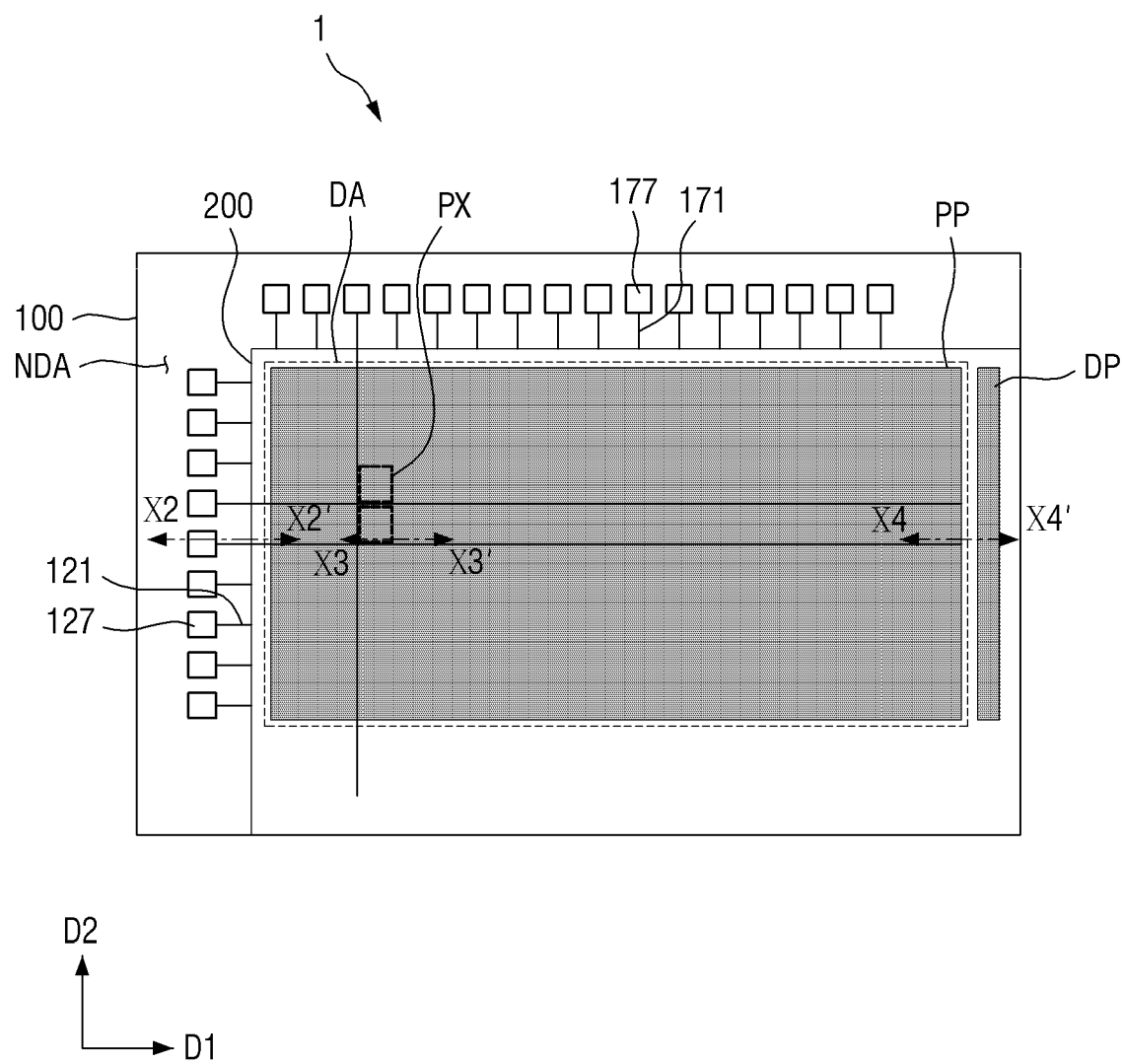
FIG. 19 is a schematic plan view of a display device according to an exemplary embodiment.
Figure 20:
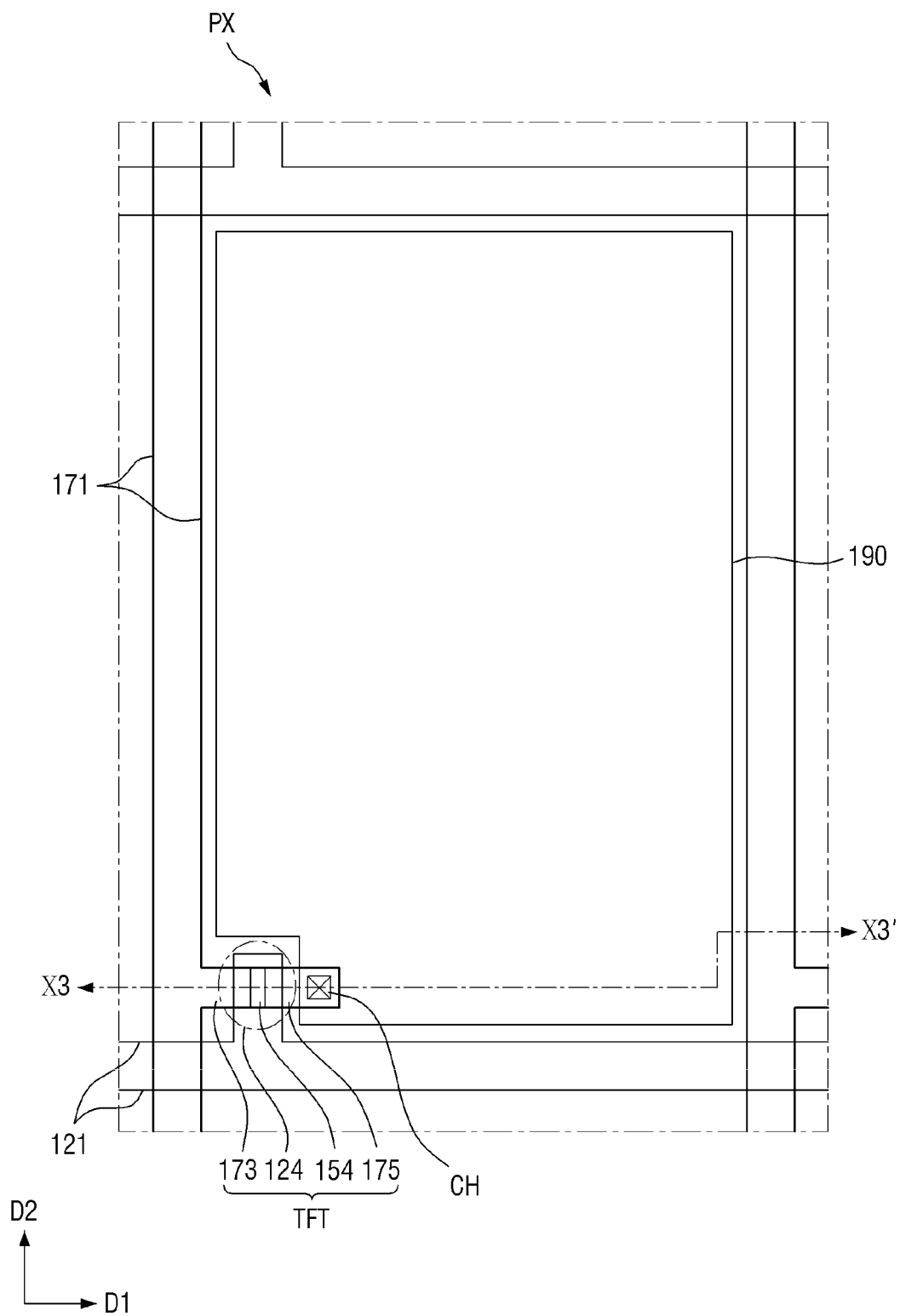
FIG. 20 is a plan view illustrating one pixel shown in FIG. 19 according to an exemplary embodiment.
Figure 21:
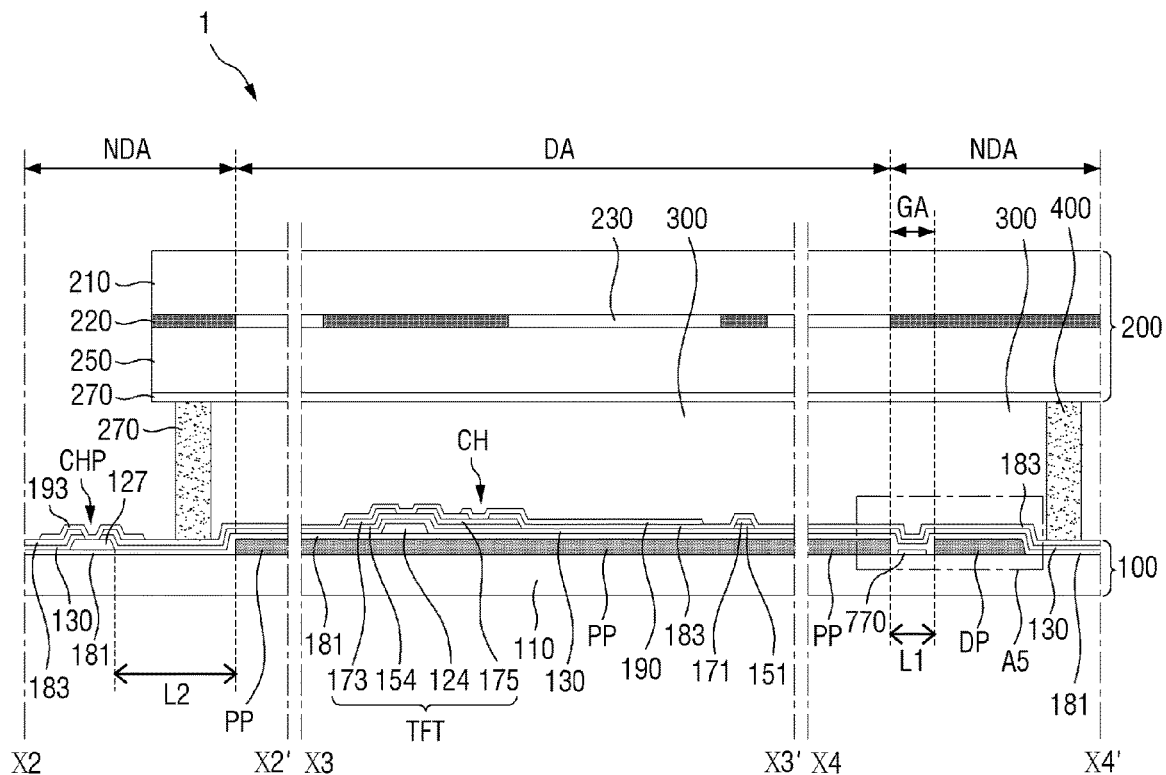
FIG. 21 is a cross-sectional view taken along lines X2-X2' and X4-X4' in FIG. 19, and line X3-X3' in FIG. 19 and FIG. 20.
Figure 22:
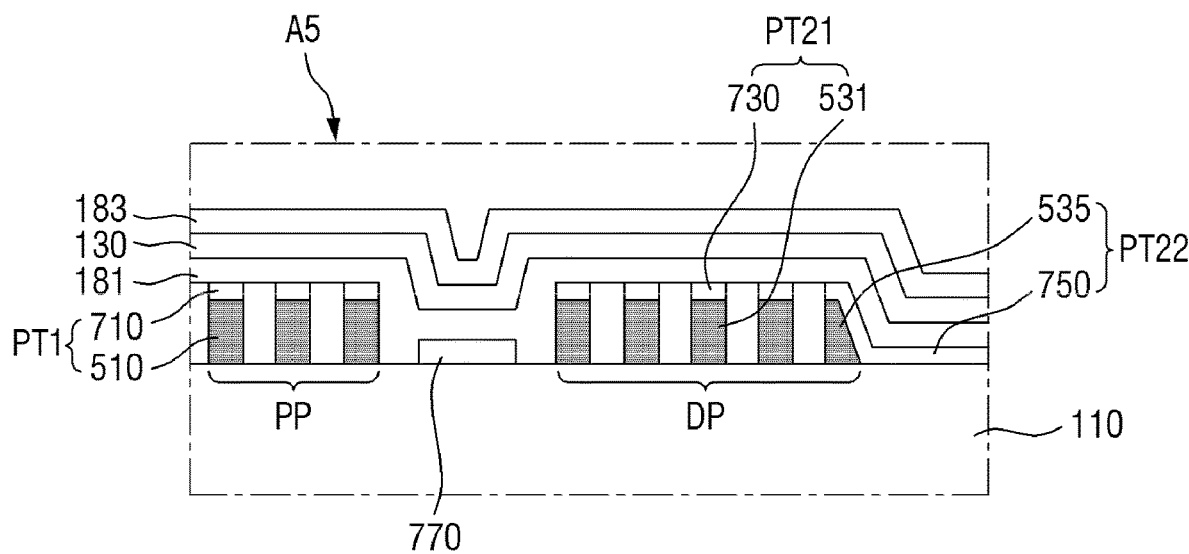
FIG. 22 is an enlarged view of part A5 of the display device of FIG. 21.

FIG. 19 is a schematic plan view of a display device according to an exemplary embodiment. FIG. 20 is a plan view illustrating one pixel shown in FIG. 19 according to an exemplary embodiment. FIG. 21 is a cross-sectional view taken along lines X2-X2' and X4-X4' in FIG. 19, and line X3-X3' in FIG. 19 and FIG. 20. FIG. 22 is an enlarged view of part A5 of FIG. 21.

Referring to FIG. 19 to FIG. 22, a display device 1 may include a first substrate 100, a second substrate 200, a sealant 400 for attaching the first substrate 100 and the second substrate 200, and a liquid crystal layer 300 disposed in a space formed by the two substrates 100 and 200 and the sealant 400.

The first substrate 100 and the second substrate 200 may have a square shape, and the first substrate 100 may be slightly larger than the second substrate 200. The first substrate 100 may include a first area DA in which pixels PX are disposed, and a second area NDA enclosing the first area DA and in which the sealant 300 and pads 127 and 177 area disposed. The first area DA may be a display area where an image is displayed, and the second area NDA may be a non-display area where an image is not displayed.

The first substrate 100 will now be described.

A first base layer 110 may include a transparent insulation substrate, and the first area DA and the second area NDA enclosing the first area DA. The first base layer 110 may be substantially the same as the base layer 10 (shown in FIG. 3) described with reference to FIG. 1 to FIG. 4.

The polarizing part PP may be disposed on the first area DA of the first base layer 110, and the dummy part DP spaced apart from the polarizing part PP may be disposed on the second area NDA of the first base layer 110. Furthermore, the hard mask residue part 770 may be disposed on the boundary area GA between the polarizing part PP and the dummy part DP in the second area NDA of the first base layer 110.

The polarizing part PP and the dummy part DP may include the metal layers 510, 531, and 535, and the hard mask layers 710, 730, and 750 disposed on the metal layers 510, 531, and 535, which may include the same material as that of the hard mask residue part 770.

The polarizing part PP may include linear patterns PT1 as described above, and the linear patterns PT1 may include the linear metal layer 510 disposed on the first area DA of the first base layer 110, and the linear hard mask layer 710 disposed on the linear metal layer 510. The linear hard mask layer 710 may include the same material as that of the hard mask residue part 770.

As described above, the dummy part DP may include at least one dummy linear pattern PT21 and the dummy defective pattern PT 22. The dummy linear pattern PT21 may include the dummy linear metal layer 531 disposed on the second area NDA of the first base layer 110 and the dummy linear hard mask layer 730 disposed on the dummy linear metal layer 531. Furthermore, the dummy defective pattern PT22 may include the dummy defective metal layer 535 disposed on the second area NDA of the first base layer 110, and the dummy defective hard mask layer 750 disposed on the dummy defective metal layer 535. The dummy linear hard mask layer 730 and the dummy defective hard mask layer 750 may include the same material as that of the hard mask residue part 770. Other more detailed descriptions of the dummy part DP and the polarizing part PP may be the same as those mentioned above, and thus repeated descriptions thereof will be omitted.

The first base layer 110, the polarizing part PP, the dummy part DP, and the hard mask residue part 770 may form one polarizer. That is, the first base layer 110, the polarizing part PP, the dummy part DP, and the hard mask residue part 770 may be substantially the same as the polarizer PL (shown in FIG. 1) described above with reference to FIG. 1 to FIG. 4.

A protective layer 181 covering the polarizing part PP, the hard mask residue part 770, and the dummy part DP may be disposed on the first base layer 110. The protective layer 181 may protect the polarizing part PP, and in exemplary embodiments, the protective layer 181 may include an inorganic material such as silicon nitride ($SiN_x$) or silicon oxide ($SiO_x$). In exemplary embodiments, the protective layer 181 may be omitted.

Gate wirings 121, 124, and 127 may be disposed on the protective layer 181. The gate wirings 121, 124, and 127 may include the gate line 121 extending in the first direction D1 or transverse direction, the gate electrode 124 of a thin film transistor TFT connected to the gate line 121, and the gate pad 127 provided at an end of the gate line 121. The gate pad 127 may have a width greater than that of the gate line 121 for connection to an external circuit. The gate line 121 may be overlapped with both the first area DA and the second area NDA of the first base layer 110, and the gate electrode 124 may be overlapped with the first area DA of the first base layer 110. Furthermore, the gate pad 127 may be overlapped with the second area NDA of the first base layer 110.

A gate insulation layer 130 may be disposed on the protective layer 181 and the gate wirings 121, 124, and 127. The gate insulation layer 130 may include an insulation material, and for example, an inorganic insulation material such as silicon nitride, silicon oxide, and silicon oxynitride.

A semiconductor layer 154 of the thin film transistor (TFT) may be disposed on the gate insulation layer 130, and at least partially overlapped with the gate electrode 124. The semiconductor layer 154 may include amorphous silicon, polycrystalline silicon, or oxide semiconductor.

Data wirings 171, 173, 175, and 177 may be formed on the gate insulation layer 130. The data wirings 171, 173, 175, and 177 may include the data line 171, the source electrode 731, the drain electrode 175, and the data pad 177. The data line 171 may extend mainly in the second direction D2 or longitudinal direction and intersect the gate line 121. The source electrode 173 may be connected to the data line 171 and extend onto an upper surface of the semiconductor layer 154. The drain electrode 175 may be separated from the source electrode 173, formed at the opposite side from the source electrode 173 centering about the gate electrode 124, and overlapped with the semiconductor layer 154. The data pad 177 may be formed at an end of the data line 171 and have a width greater than that of the data line 171 for connection to an external circuit.

The data line 171 may be overlapped with both the first area DA and the second area NDA of the first base layer 110, and a semiconductor pattern 151 may be disposed beneath the data line 171. The source electrode 173 and the drain electrode 175 may be overlapped with the first area DA of the first base layer 110, and the data pad 177 may be overlapped with the second area NDA of the first base layer 110. The gate electrode 124, the source electrode 173, the drain electrode 175, and the semiconductor layer 154 may form one thin film transistor (TFT) as a switching element.

The thin film transistor (TFT) may be overlapped with the first area DA of the first base layer 110.

An insulation layer 183 may be disposed on the thin film transistor (TFT). The insulation layer 183 may cover the thin film transistor (TFT) and contact the gate insulation layer 130. The insulation layer 183 may include an inorganic insulation material such as silicon nitride ($SiN_x$) or silicon oxide ($SiO_x$), a low dielectric constant organic insulation layer, or the like.

A contact hole CH for exposing a part of the drain electrode 175 may be formed in the insulation layer 183, and a pad contact hole CHP for exposing a part of the gate pad 127 may be formed in the insulation layer 183 and the gate insulation layer 130. Furthermore, although not shown in the drawings, the contact hole 183 may further include a contact hole formed therein so as to expose a part of the data pad 177.

Transparent conductive layers 190 and 193 may include a transparent conductive material, such as indium tin oxide (ITO), indium zinc oxide (IZO), indium tin zinc oxide (ITZO), and Al-doped zinc oxide (AZO) may be formed on the insulation layer 183. The transparent conductive layers 190 and 193 may include the pixel electrode 190 connected to the drain electrode 175 of the thin film transistor (TFT) through the contact hole CH, and the connection member 193 connected to the gate pad 127 through the pad contact hole CHP for exposing the gate pad 127. Although not shown in the drawings, the transparent conductive layers 190 and 193 may further include a contact member connected to the data pad 177 through the contact hole for exposing the data pad 177.

The second substrate 200 will now be described.

A second base layer 210 may be a transparent insulation substrate like the first base layer 110. In exemplary embodiments, the second base layer 20 may have flexibility.

A light blocking member 220 may be interposed between the second base layer 210 and the liquid crystal layer 300, more specifically, on one surface of the second base layer 210 facing the first base substrate 100. The light blocking member 220 may be disposed to overlap the gate line 121, the data line 171, and the thin film transistor (TFT), and disposed to enclose the first area DA of the first base layer 110 in plan view. In particular, the light blocking member 220 may be disposed in a portion of the second base layer 210 and overlap the second area NDA of the first base layer 110. The light blocking member 220 may include chrome oxide or an organic material including black pigment.

A color filter 230 may be disposed on one surface of the second base layer 210 and overlap the first area DA of the first base layer 110. The color filter 230 may enable one of primary colors including red, green, and blue colors to be displayed. However, the present disclosure is not limited to the primary colors of red, green, and blue, and the color filter 230 may enable any one of cyan-, magenta-, yellow- and white-based colors to be displayed. In exemplary embodiments, the color filter 230 may overlap a part or substantially the entire pixel electrode 190.

An overcoat layer 250 may be formed on the light blocking member 220 and the color filter 230. The overcoat layer 250 may relieve a stepped portion formed by the color filter 230 or the light blocking member 220, and planarize one surface of the second base layer 210. In exemplary embodiments, the overcoat layer 250 may be omitted.

A common electrode 270 may be disposed on the overcoat layer 250. The common electrode 270 may include a transparent conductive material such as indium tin oxide (ITO) or indium zinc oxide (IZO), and may apply voltage to the liquid crystal layer 300 along with the pixel electrode 190 and adjust alignment state in the liquid crystal layer 300.

Although not shown in the drawings, an alignment layer may be formed on the pixel electrode 190 and the common electrode 270. In addition, although not shown in the drawings, a polarizing member may be disposed on the second base layer 210. In exemplary embodiments, the polarizing member may be disposed on the other surface of the second base layer 210. A second polarizing member PL2 may be a stretchable polarizing film.

The sealant 400 may be provided along an edge of the second substrate 200, between the first substrate 100 and the second substrate 200. The sealant 400 may be disposed to be overlapped with the second area NDA of the first base layer 110, and include ultraviolet-curable resin such as acrylic resin. Furthermore, the sealant 400 may further include epoxy resin, which is thermosetting resin, an amine-based curing agent, filler such as alumina powder, a spacer, and the like.

In exemplary embodiments, the sealant 400 may not overlap the dummy part DP, and the dummy part DP may be disposed relatively closer to the first area DA as compared with the sealant 400. In particular, the sealant 400 may be disposed relatively closer to the edge of the first base layer 110 as compared with the dummy part DP.

In exemplary embodiments, the sealant 400 may not overlap the gate pad 127. More particularly, the sealant 400 may be disposed relatively closer to the first area DA as compared with the gate pad 127.

When the shortest gap or shortest horizontal gap between the polarizing part PP and the dummy part DP is referred to as a first gap L1, and the shortest gap or shortest horizontal gap between the polarizing part PP and the gate pad 127 is referred to as a second gap L2, the first gap L1 may be relatively less than the second gap L2. In particular, the dummy part DP may be relatively closer to the polarizing part PP as compared with the gate pad 127. As used herein, "the shortest horizontal gap" may mean the shortest gap between two components when the two components are projected on the same plane. In other words, the shortest horizontal gap may mean the shortest gap between two components in plan view.

The liquid crystal layer 300 may be disposed in a space formed by the first substrate 100, the second substrate 200, and the sealant 300. An alignment in the liquid crystal layer 300 may change by a voltage difference between the pixel electrode 190 and the common electrode 270.

The display device 1 described above may include the polarizing part PP having the uniform linear pattern PT1 at the edge thereof, thus improving the reliability of the display device 1.

Figure 23:
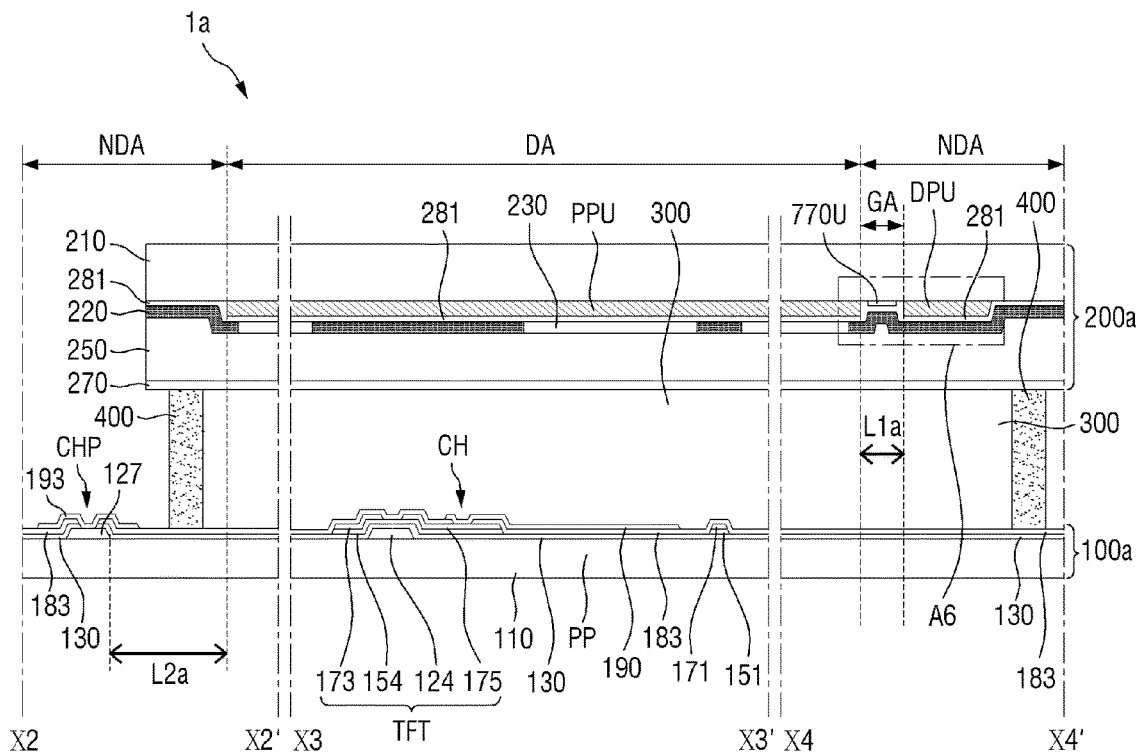
FIG. 23 is a cross-sectional view of a display device according to an exemplary embodiment.
Figure 24:
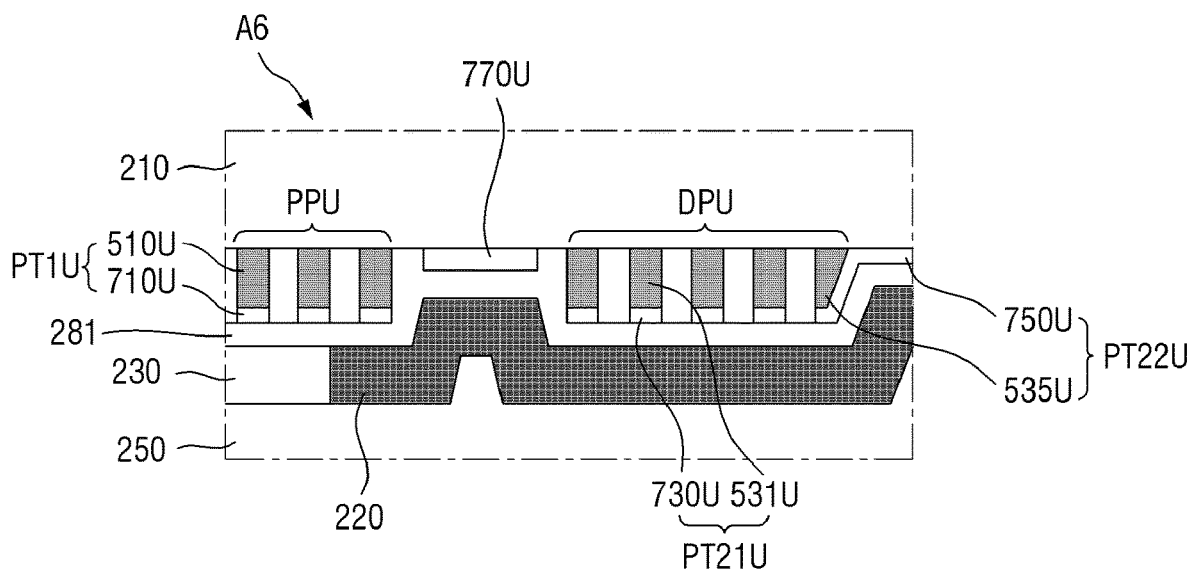
FIG. 24 is an enlarged view of part A6 of the display device of FIG. 23.

FIG. 23 is a cross-sectional view of a display device according to an exemplary embodiment. FIG. 24 is an enlarged view of part A6 of FIG. 23.

Referring to FIG. 23 and FIG. 24, a display device 1a according to an exemplary embodiment may include a first substrate 100a, a second substrate 200a, a sealant 400 for attaching the first substrate 100a and the second substrate 200a, and the liquid crystal layer 300 disposed in a space formed by the two substrates 100a and 200a and the sealant 400. Hereinafter, description will be made mainly on differences of the elements constituting the first and second substrates 100a and 200a.

The first substrate 100a will now be described.

The first substrate 100a may differ from the first substrate 100 (shown in FIG. 21) described above with reference to FIG. 21 and FIG. 22, in that the polarizing part PP (shown in FIG. 21), the dummy part DP (shown in FIG. 21), the hard mask residue part 770 (shown in FIG. 21), and the first protective layer 181 (shown in FIG. 21) may not be disposed on the first base layer 110, and other components are substantially the same or similar.

The second substrate 200a will now be described.

A polarizing part PPU, a dummy part DPU, and a hard mask residue part 770U may be disposed on one surface of the second base layer 210 facing the first substrate 100a.

The polarizing part PPU may be disposed on a part of one surface of the second base layer 210, and overlap the first area DA of the first base layer 110. The dummy part DPU may be disposed on a part of one surface of the second base layer 210, and overlap the second area NDA of the first base layer 110, such that the dummy part DPU is spaced apart from the polarizing part PPU. Furthermore, the hard mask residue part 770U may be disposed on the part of one surface of the second base layer 210, and overlap the boundary area GA of the first base layer 110.

The polarizing part PPU and the dummy part DPU may have structures that are substantially the same as those of the polarizing part PP (shown in FIG. 21 and FIG. 22) and the dummy part DP (shown in FIG. 21 and FIG. 22) described above. More particularly, the polarizing part PPU and the dummy part DPU may include metal layers 510U, 531U, and 535U, and hard mask layers 710U, 730U, and 750U disposed on the metal layers 510U, 531U, and 535U, and made have the same material as that of the hard mask residue part 770U.

More specifically, the polarizing part PPU may include linear patterns PT1U, and each of the linear patterns PT1U may include the linear metal layer 510U formed on one surface of the second base layer 210, and the linear hard mask layer 710U disposed on the linear metal layer 510U. Other descriptions of the polarizing part PPU may be substantially the same as those of the polarizing part PP (shown in FIG. 1 to FIG. 4) described above with reference to FIG. 1 to FIG. 4.

The dummy part DPU may include at least one dummy linear pattern PT21U, and further include a dummy defective pattern PT22U. The dummy linear pattern PT21U may include the dummy linear metal layer 531U formed on one surface of the second base layer 210, and the dummy linear hard mask layer 730U disposed on the dummy linear metal layer 531U. The dummy defective pattern PT22U may include the dummy defective metal layer 535U formed on one surface of the second base layer 210, and the dummy defective hard mask layer 750U disposed on the dummy defective metal layer 535U. Other descriptions of the dummy part DPU may be substantially the same as those of the dummy part DP described above with reference to FIG. 1 to FIG. 4.

A protective layer 281 covering the polarizing part PPU, the hard mask residue part 770U, and the dummy part DPU may be disposed on one surface of the second base layer 210. The protective layer 281 may protect the polarizing part PPU, and in exemplary embodiments, the protective layer 281 may be include an inorganic material such as silicon nitride ($SiN_x$) or silicon oxide ($SiO_x$). In exemplary embodiments, the protective layer 281 may be omitted.

The light blocking member 220 may be disposed on one surface of the protective layer 281. The light blocking member 220 may be disposed to overlap the gate line 121, the data line 171, and the thin film transistor (TFT), and disposed to enclose the first area DA of the first base layer 110 in plan view.

The color filter 230 may be disposed on one surface of the second base layer 210 and overlap the first area DA of the first base layer 110.

The overcoat layer 250 may be disposed on the light blocking member 220 and the color filter 230, and the common electrode 270 may be disposed on the overcoat layer 250.

The sealant 400 may be provided along an edge of the second substrate 200a, between the first substrate 100a and the second substrate 200a. In exemplary embodiments, the sealant 400 may not overlap the dummy part DPU. Furthermore, in exemplary embodiments, the sealant 400 may not overlap the gate pad 127.

When the shortest gap or shortest horizontal gap between the polarizing part PPU and the dummy part DPU is referred to as a first gap L1a, and the shortest gap or shortest horizontal gap between the polarizing part PPU and the gate pad 127 is referred to as a second gap L2s, the first gap L1a may be relatively less than the second gap L2a.

Figure 25:
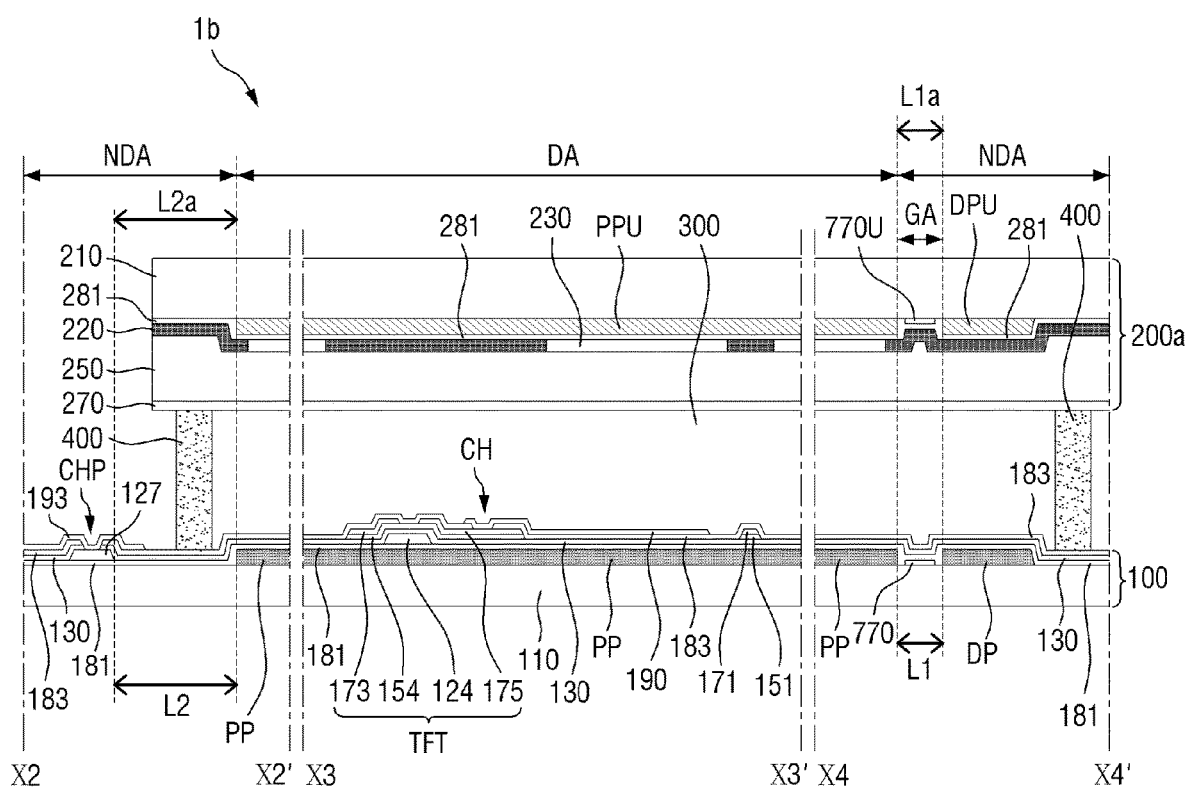
FIG. 25 is a cross-sectional view of a display device according to an exemplary embodiment.

FIG. 25 is a cross-sectional view of a display device according to an exemplary embodiment.

Referring to FIG. 25, a display device 1b according to an exemplary embodiment may include the first substrate 100, the second substrate 200a, the sealant 400 for attaching the first substrate 100 and the second substrate 200a, and the liquid crystal layer 300 disposed in a space formed by the two substrates 100 and 200a and the sealant 400.

The display device 1b may differ from the display device 1 (shown in FIG. 21) described with reference to FIG. 21 and FIG. 22, in that the second substrate 200a may further include the polarizing part PPU, the dummy part DPU, the hard mask residue part 770U, and the protective layer 281, and other components may be substantially the same. Furthermore, components of the second substrate 200a may be substantially the same as those mentioned with reference to FIG. 23 and FIG. 24, and thus, repeated description thereof will be omitted.

Figure 26:
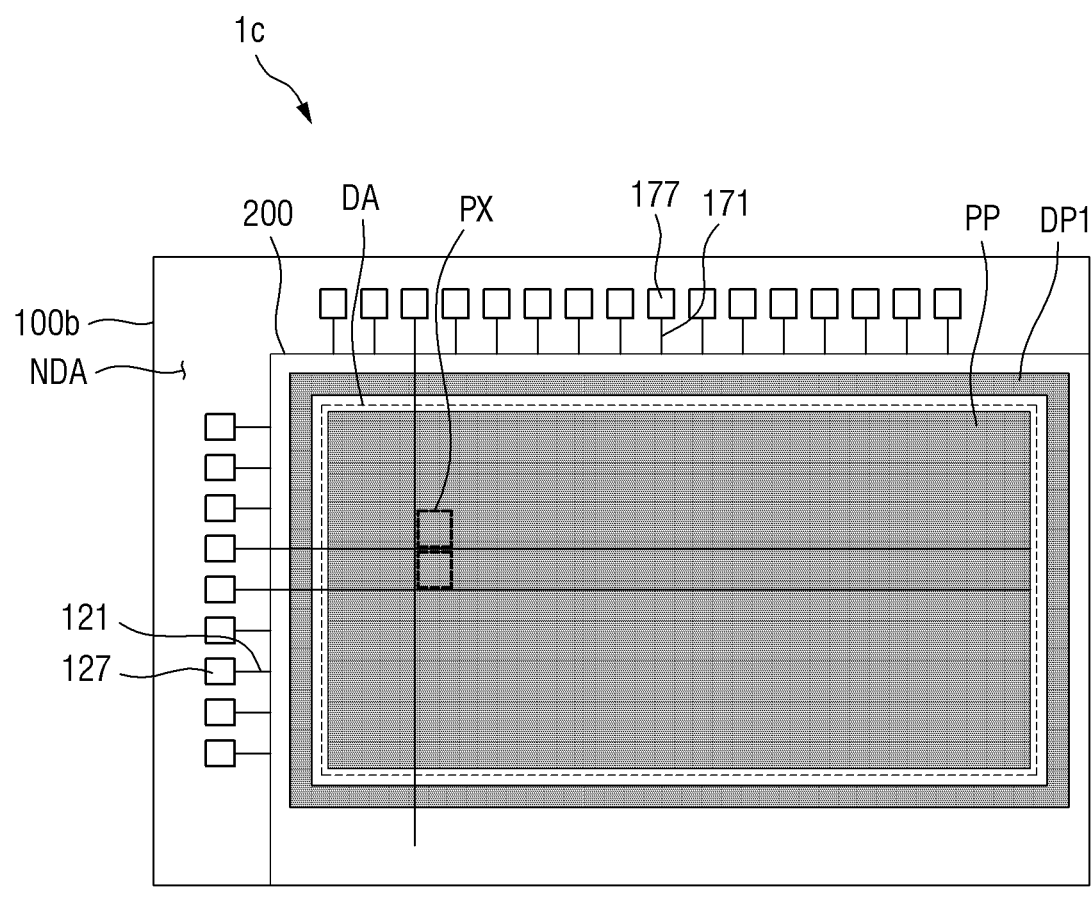
FIG. 26 is a plan view of a display device according to an exemplary embodiment.

FIG. 26 is a plan view of a display device according to an exemplary embodiment.

Referring to FIG. 26, a display device 1c according to an exemplary embodiment may differ from the display device 1 (shown in FIG. 21) described above with reference to FIG. 21 and FIG. 22, in that a first substrate 100b may include the polarizing part PP, and the dummy part DP1 enclosing the polarizing part PP in plan view, and other components may be substantially the same. Other descriptions of the polarizing part PP and the dummy part DP1 may be substantially the same as those mentioned above with reference to FIG. 16, and thus repeated descriptions thereof will be omitted.

Although, in the drawings, the first substrate 100b is illustrated as including the polarizing part PP and the dummy part DP1, however, the polarizing part PP and the dummy part DP1 may be included in the second substrate 200. Furthermore, each of the first substrate 100b and the second substrate 200 may include the polarizing part PP and the dummy part DP1.

Figure 27:
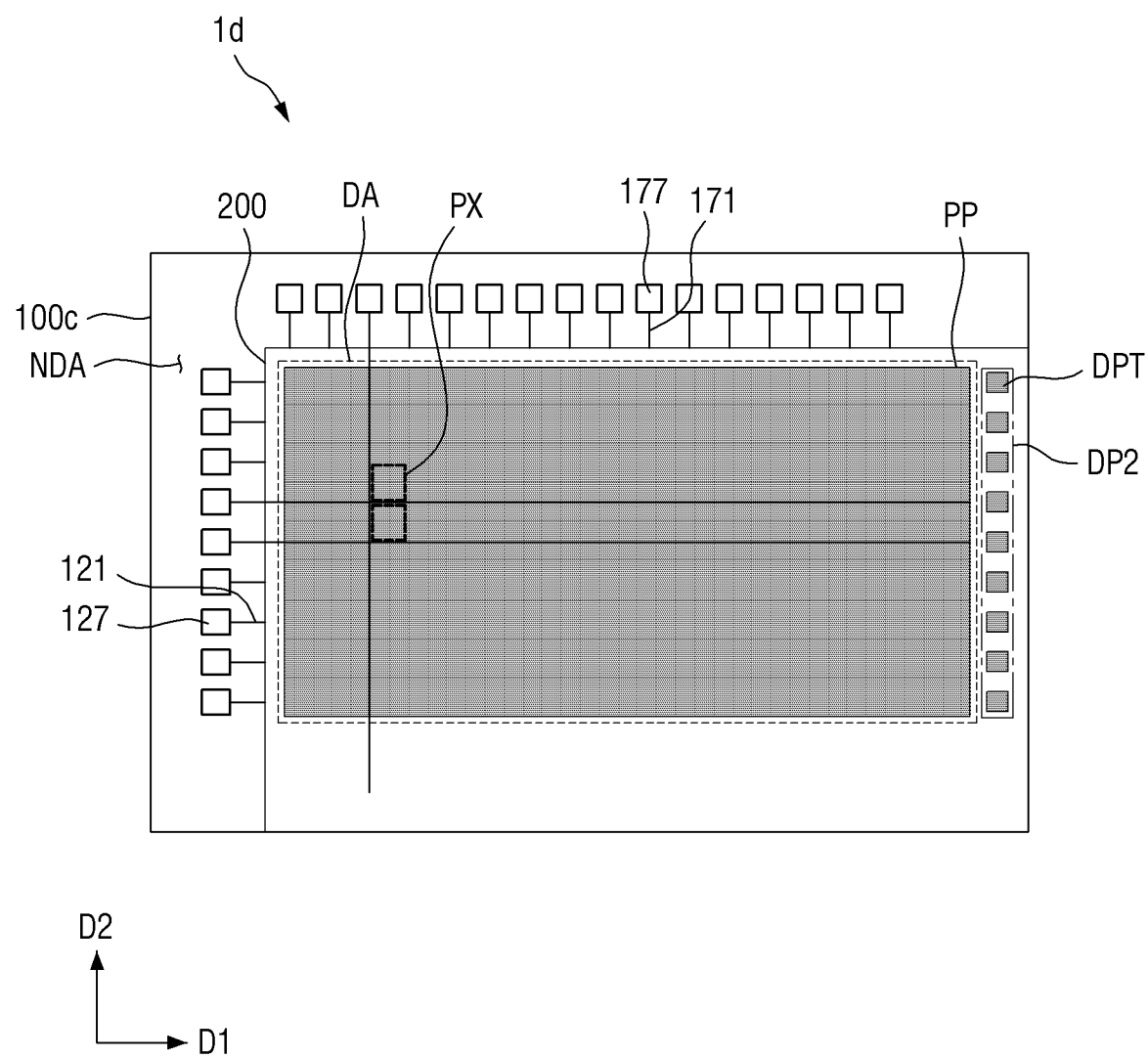
FIG. 27 is a plan view of a display device according to an exemplary embodiment.

FIG. 27 is a plan view of a display device according to an exemplary embodiment.

Referring to FIG. 27, a display device 1d according to an exemplary embodiment may differ from the display device 1 (shown in FIG. 21) described above with reference to FIG. 21 and FIG. 22, in that a first substrate 100c may include the polarizing part PP and a dummy part DP2, and the dummy part DP2 may include island dummy patterns DPT spaced apart from each other, and other components may be substantially the same. Other descriptions of the polarizing part PP and the dummy part DP2 may be substantially the same as those mentioned above with reference to FIG. 17, and thus repeated descriptions thereof will be omitted.

Although, in the drawings, the first substrate 100c is illustrated as including the polarizing part PP and the dummy part DP2, however, the polarizing part PP and the dummy part DP2 may be included in the second substrate 200, and each of the first substrate 100c and the second substrate 200 may include the polarizing part PP and the dummy part DP2.

Figure 28:
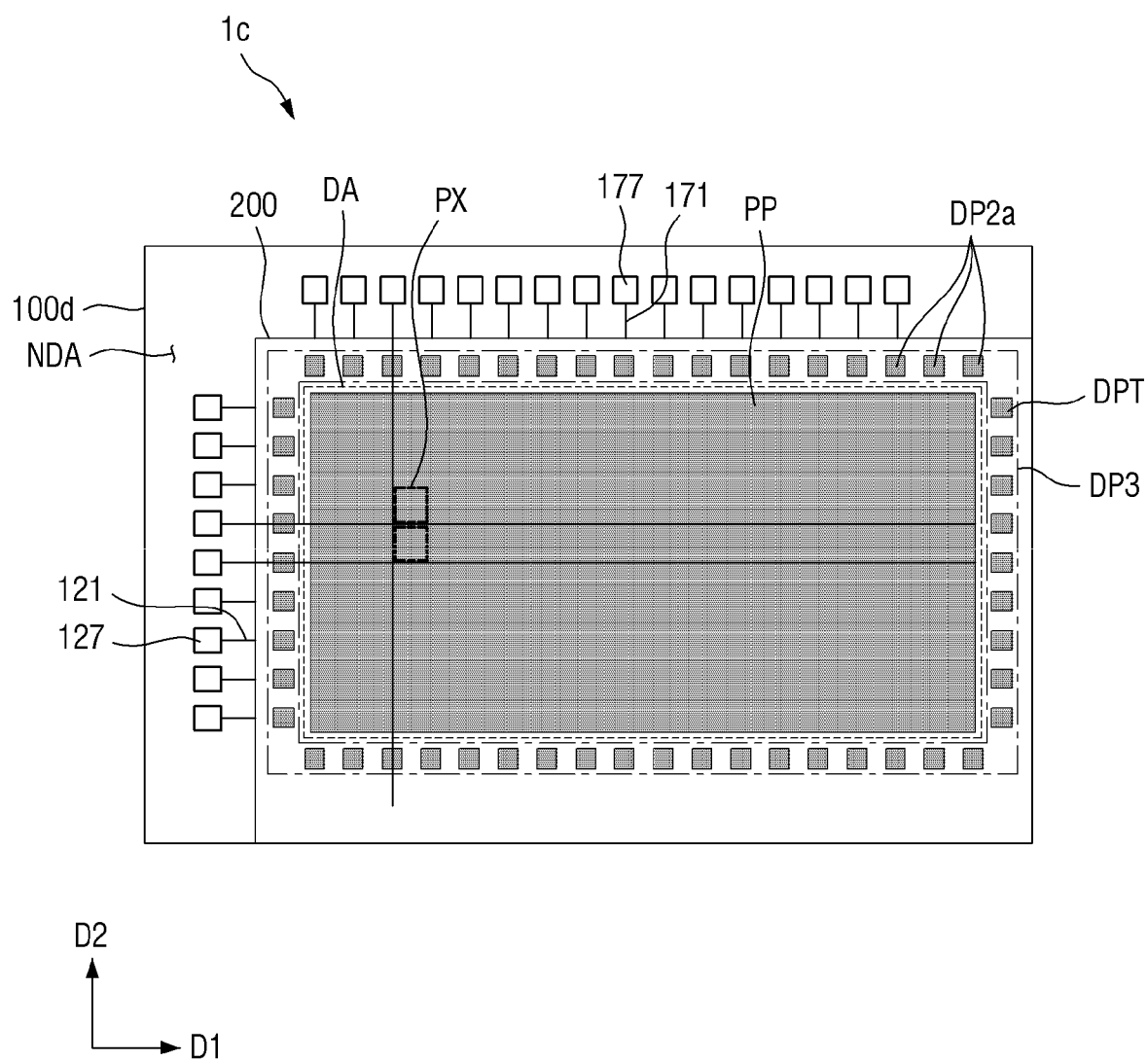
FIG. 28 is a plan view of a display device according to an exemplary embodiment.

FIG. 28 is a plan view of a display device according to an exemplary embodiment.

Referring to FIG. 28, a display device 1e according to an exemplary embodiment may differ from the display device 1 (shown in FIG. 21) described above with reference to FIG. 21 and FIG. 22, in that a first substrate 100d may include the polarizing part PP and a dummy part DP3 enclosing the polarizing part PP in plan view, and the dummy part DP3 may include island dummy patterns DPT spaced apart from each other, and other components may be substantially the same. Other descriptions of the polarizing part PP and the dummy part DP3 may be substantially the same as those mentioned above with reference to FIG. 18, and thus repeated descriptions thereof will be omitted.

Although, in the drawings, the first substrate 100d is illustrated as including the polarizing part PP and the dummy part DP3, however, the polarizing part PP and the dummy part DP3 may be included in the second substrate 200, and each of the first substrate 100d and the second substrate 200 may include the polarizing part PP and the dummy part DP3.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A polarizer comprising:
a base layer comprising a first area and a second area enclosing the first area;
a polarizing part disposed on the first area of the base layer, the polarizing part comprising a plurality of linear patterns spaced apart from each other;
a dummy part disposed on the second area of the base layer and spaced apart from the polarizing part; and
a hard mask residue part disposed on a portion of the second area of the base layer between the polarizing part and the dummy part and contacting the base layer,
wherein each of the polarizing part and the dummy part comprises:
a metal layer disposed directly on the base layer; and
a hard mask layer disposed directly on the metal layer and comprising the same insulating material as the hard mask residue part, and
wherein the hard mask residue part is a separate piece and is spaced apart from the hard mask layer.

2. The polarizer of claim 1, wherein the dummy part has a stripe shape extending along an edge of the polarizing part.

3. The polarizer of claim 1, wherein the dummy part surrounds the polarizing part in plan view.

4. The polarizer of claim 1, wherein the dummy part comprises a plurality of island dummy patterns disposed on the second area of the base layer and spaced apart from each other.

5. The polarizer of claim 1, wherein the dummy part comprises at least one linear dummy pattern having a width substantially the same as a width of one of the linear patterns.

6. The polarizer of claim 1, wherein a shortest gap between the polarizing part and the dummy part is greater than a width of a linear pattern of the linear patterns.

7. The polarizer of claim 1, wherein:
the metal layer comprises at least one of aluminum (Al), gold (Au), silver (Ag), copper (Cu), chrome (Cr), iron (Fe), and nickel (Ni); and
the hard mask layer comprises at least one of silicon oxide ($SiO_x$) and silicon nitride ($SiN_x$).

8. The polarizer of claim 1, wherein the dummy part comprises at least one linear dummy pattern having a slanted side surface.

9. A display device comprising:
a first substrate comprising:
a first base layer comprising a first area and a second area enclosing the first area;
a first polarizing part disposed on the first area of the first base layer, the first polarizing part comprising a plurality of first linear patterns spaced apart from each other;
a first dummy part disposed on the second area of the first base layer and spaced apart from the first polarizing part; and
a first hard mask residue part disposed on a portion of the second area of the first base layer between the first polarizing part and the first dummy part and contacting the first base layer;
a second substrate facing the first substrate; and
a liquid crystal layer interposed between the first substrate and the second substrate,
wherein each of the first polarizing part and the first dummy part comprises:
a first metal layer disposed directly on the first base layer; and
a first hard mask layer disposed directly on the first metal layer and comprising the same insulating material as the first hard mask residue part, and
wherein the first hard mask residue part is a separate piece and is spaced apart from the first hard mask layer.

10. The display device of claim 9, further comprising a sealant interposed between the first substrate and the second substrate and overlapping the second area of the first base layer.

11. The display device of claim 10, wherein the first dummy part does not overlap the sealant.

12. The display device of claim 10, wherein the sealant is disposed relatively closer to an edge of the first base layer as compared to the first dummy part.

13. The display device of claim 9, wherein the first substrate further comprises:
a first protective layer disposed on the first base layer and covering the first polarizing part, the first dummy part, and the first hard mask residue part;
a thin film transistor disposed on the first protective layer and overlapping the first area of the first base layer;
an insulation layer disposed on the thin film transistor; and
a pixel electrode disposed on the insulation layer and overlapping the first area of the first base layer, and electrically connected to the thin film transistor.

14. The display device of claim 13, wherein:
the first substrate further comprises a pad disposed on the first protective layer and overlapping the second area of the first base layer, and electrically connected to the thin film transistor; and
a shortest horizontal gap between the pad and the first polarizing part is greater than a shortest horizontal gap between the first dummy part and the first polarizing part.

15. The display device of claim 9, wherein:
the second substrate comprises:
- a second polarizing part disposed on one surface of a second base layer, the second polarizing part comprising a plurality of second linear patterns spaced apart from each other and overlapping the first area of the first base layer;
- a second dummy part disposed on one surface of the second base layer and overlapping the second area of the first base layer and spaced apart from the second polarizing part; and
- a second hard mask residue part disposed on one surface of the second base layer, the second hard mask residue part overlapping the second area of the first base layer, interposed between the second polarizing part and the second dummy part, and contacting one surface of the second base layer; and the second polarizing part and the second dummy part comprise:
- a second metal layer disposed on one surface of the second base layer; and
- a second hard mask layer disposed on the second metal layer and comprising the same material as the second hard mask residue part.

16. The display device of claim 15, wherein the second substrate further comprises a second protective layer disposed on the second polarizing part, the second dummy part, and the second hard mask residue part.

17. The display device of claim 16, wherein the second substrate further comprises:
- a light blocking member disposed on the second protective layer and overlapping the second area of the second base layer; and
- a common electrode disposed on the light blocking member.

* * * * *